(12) United States Patent
Ou et al.

(10) Patent No.: US 8,130,752 B2
(45) Date of Patent: *Mar. 6, 2012

(54) REAL-TIME NETWORK MEASUREMENT

(75) Inventors: Frank Y. Ou, Fremont, CA (US);
Thomas Richard Gonzalez, Plano, TX (US); Martin Reckleben, San Jose, CA (US)

(73) Assignee: Telco Acquisition I, Inc., Mansfield, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/139,393

(22) Filed: Jun. 13, 2008

(65) Prior Publication Data

US 2009/0310494 A1 Dec. 17, 2009

(51) Int. Cl.
*H04L 12/28* (2006.01)
*H04L 12/66* (2006.01)
*G01R 31/08* (2006.01)

(52) U.S. Cl. .............. 370/352; 370/252; 370/395.21

(58) Field of Classification Search .......... 370/241, 370/241.1, 244, 245, 246, 247, 248, 250, 370/251, 252, 236.2, 235, 229, 395.21, 216, 370/217, 218, 468, 395.4
See application file for complete search history.

(56) References Cited

U.S. PATENT DOCUMENTS

| | | | | |
|---|---|---|---|---|
| 5,477,531 | A * | 12/1995 | McKee et al. | 370/249 |
| 6,542,499 | B1 * | 4/2003 | Murphy et al. | 370/352 |
| 7,058,048 | B2 * | 6/2006 | Clark | 370/356 |
| 7,388,946 | B1 * | 6/2008 | Mussman et al. | 379/15.01 |
| 2005/0207435 | A1 | 9/2005 | Christie et al. | |
| 2005/0281204 | A1 * | 12/2005 | Karol et al. | 370/248 |
| 2007/0183317 | A1 * | 8/2007 | Vasseur et al. | 370/225 |
| 2008/0049746 | A1 | 2/2008 | Morrill et al. | |
| 2008/0052394 | A1 * | 2/2008 | Bugenhagen et al. | 709/224 |
| 2008/0259937 | A1 * | 10/2008 | Hagenauer et al. | 370/400 |
| 2009/0310508 | A1 * | 12/2009 | Ou et al. | 370/253 |

OTHER PUBLICATIONS

U.S. Appl. No. 12/139,387, filed Jun. 13, 2008, Ou et al.
International Search Report and Written Opinion mailed Jun. 25, 2009 in International Application No. PCT/US2009/042620 12 pages.

* cited by examiner

*Primary Examiner* — Hanh Nguyen
(74) *Attorney, Agent, or Firm* — Maine Cernota & Rardin

(57) ABSTRACT

A method of operation within a device coupled to a network. A first set of data is received from a first data path of the network. A first set of measurement information is identified from the first set of data, and a quality of the first data path is determined based on the first set of measurement information. A second set of data is then selectively transmitted via either the first data path or a second data path of the network, based on the quality of the first data path.

22 Claims, 19 Drawing Sheets

REAL-TIME NETWORK MEASUREMENT

TECHNICAL FIELD

The disclosure herein relates generally to network systems, and more specifically to near real-time measurements of the quality of network systems.

BACKGROUND

A network system is generally made up of two or more end devices (e.g., computers or terminals) which communicate with one another via one or more data paths within the network. The data paths are typically made up of cables and other devices (e.g., routers, switches, repeaters, and/or terminals), all of which may affect the transfer of data across the network (e.g., delay, jitter, and/or data throughput). Larger networks (e.g., Ethernet systems) generally have more intricate data paths, and thus more factors affecting the "quality" of the network.

FIG. 1 illustrates a typical network system 100, including two devices, 110 and 120, connected to one another via a network infrastructure 150. In general, the devices 110 and 120 transfer data between one another with little or no knowledge as to the quality of the data paths traversed by the individual data packets 101. However, it may be desirable for at least one of the devices 110 or 120 to be able to determine the quality of the network infrastructure 150 at any given time. For example, suppose the network system 100 is a carrier Ethernet system. The ability to monitor the quality of the network infrastructure 150 may allow an Internet Service Provider to market its services (e.g., at a premium) with a network quality guarantee.

Prior attempts to measure the quality of the network have generally required test sets (e.g., "probes") to be placed at both ends of the network and/or require both end devices to work in combination to measure the quality of the network. Such measurement techniques are typically performed in an "on-demand" manner, in which a specific measurement or testing session must be initiated within both end devices and/or probes. However, such processes hinder standard communications between the end devices, as the flow of user data must first be stopped in order for test packets to be (continuously) sent.

There thus remains a need for a more reliable way of determining the quality of a network. There further remains a need for a network quality measurement which may be performed regularly (e.g., continuously) without hindering the flow of user data (e.g., "real-time").

BRIEF DESCRIPTION OF THE DRAWINGS

The disclosure herein is illustrated by way of example, and not by way of limitation, in the figures of the accompanying drawings and in which like reference numerals refer to similar elements and in which.

DETAILED DESCRIPTION

In embodiments disclosed herein, a network measurement is provided for determining the quality of a network in real-time. In specific embodiments, network measurement information is transmitted between devices on a network without interrupting a flow of data traffic. In other embodiments, a device on a network determines the quality of the network based on information "looped-back" by another device on the network (e.g., in regular intervals). In another embodiment, a network system includes one or more protective circuits (e.g., fixed/pretested data paths) which may be activated when the quality of a given data path falls below a threshold level. In yet another embodiment, one or more intermediate devices on a network may be used to precisely identify problematic areas within a network (e.g., by "snooping" network measurement information transmitted between two end devices). For purposes of discussion, "data" as used herein refers to any encoded information (for example, but not limited to: packets, bits, and/or bytes). In addition, "real-time" may be used herein to mean approximate or near real-time. Furthermore, "network device" and "end device" may be used herein interchangeably.

Figure 1:
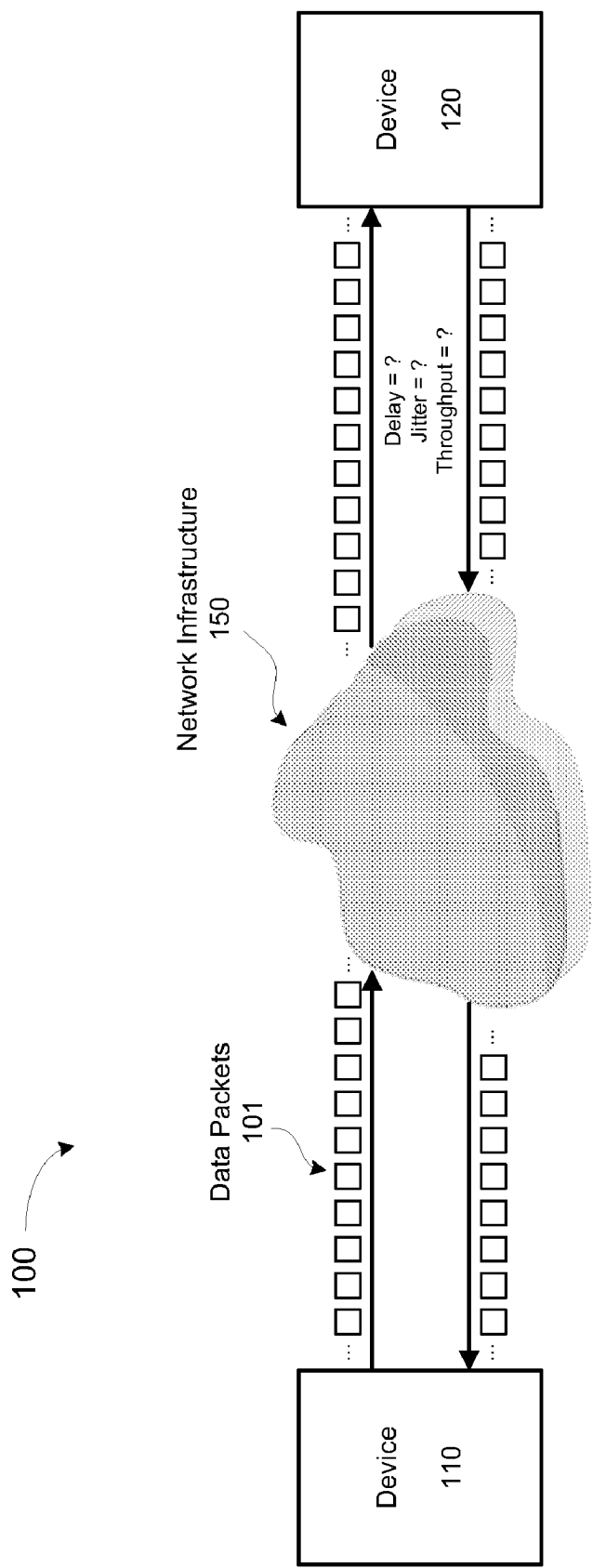
FIG. 1 illustrates a typical network system.
Figure 2:
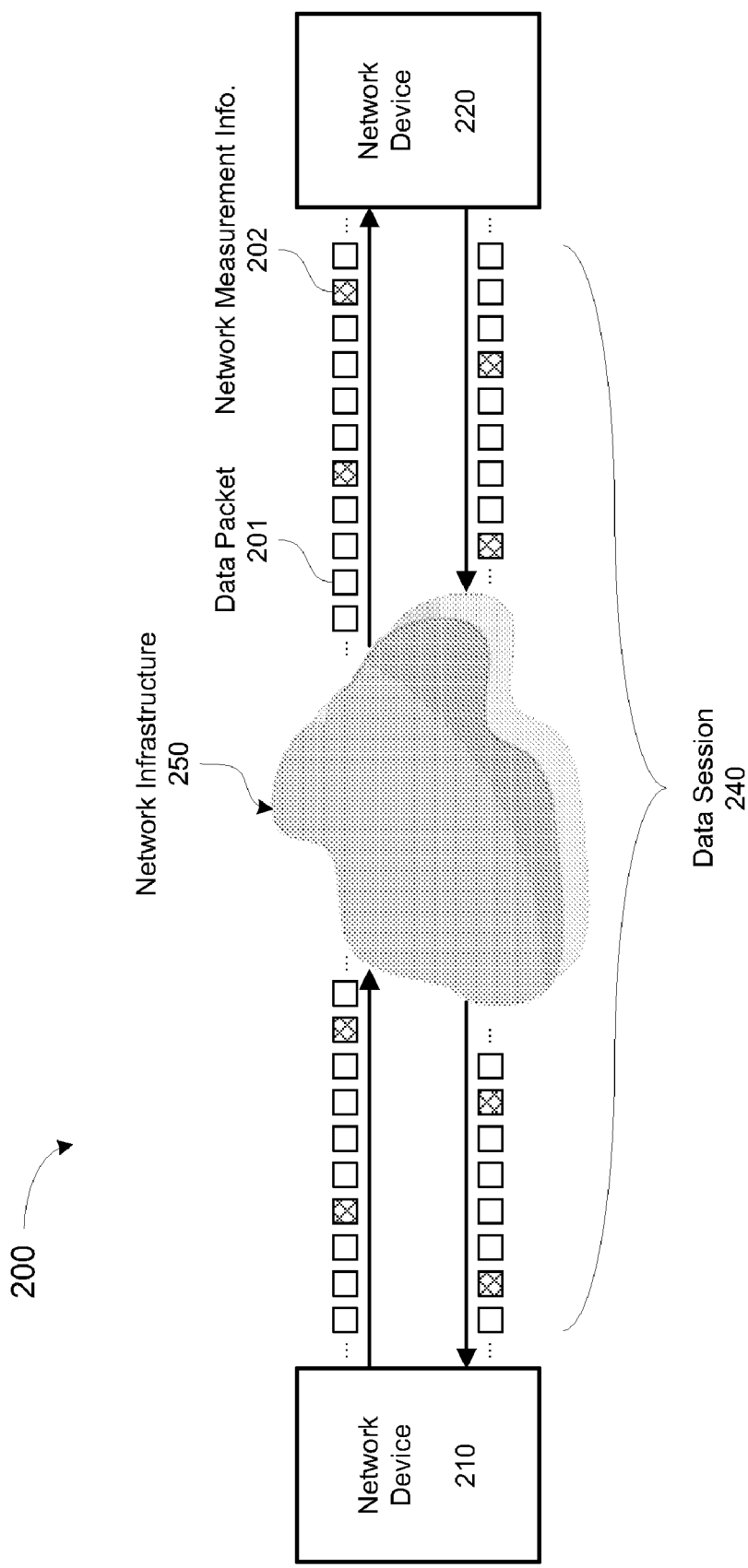
FIG. 2 illustrates a network system according to an embodiment.

FIG. 2 illustrates a network system 200, including two network devices, 210 and 220, connected to one another via a network infrastructure 250. According to an embodiment the network device 210 transfers data packets 201 and network measurement information 202 to the network device 220, within the same data session 240. For example, the data packets 201 may correspond to data requested by the network device 220 (or a computer/terminal connected to the network device 220). Alternatively, the data packets 201 may correspond to data requests sent by the network device 210 (or a computer/terminal connected to the network device 210).

According to an embodiment, the network measurement information 202 is provided on an existing data packet 201 within the data session 240. For example, the IEEE 802.1ag draft standard and ITU Y.1731 define a Continuity Check Message (CCM) which is transmitted regularly and used for detecting a loss of connectivity between two end points in the network. The CCM packet may include a user-defined Type Length Value (TLV) field wherein such network measurement information 202 may be provided. It should be noted, however, that the network measurement information 202 may be transmitted via (e.g., included in the body or payload of) any one of the data packets 201. Alternatively, a network measurement packet may be generated, for dedicated purpose of carrying the network measurement information 202, and subsequently transmitted in sequence with the data packets 201 (e.g., during one or more "empty intervals" wherein no data packets 201 are transmitted).

Once received by the network device 220, the network measurement information 202 is then "looped-back" (e.g., transmitted back) to the network device 210. Additionally, the network device 220 may interpret (i.e. process) the received network measurement information and/or transmit additional network measurement parameters to the network device 210, along with the looped-back network measurement information. According to an embodiment, the network device 220 temporarily stores the network measurement information 202 until it can be transmitted, without interrupting a flow of data packets 201 also being transmitted by the network device 220. The network device 210 receives the looped-back network measurement information 202 and interprets the information received to determine a quality of the network infrastructure 250 (e.g., based on one or more properties including: delay, jitter, data throughput, bandwidth, and/or data loss of the network infrastructure 250).

In the network system 200, network measurement information 202 may be transmitted back and forth between the network devices 210 and 220 without interrupting the data session 240. In other words, the network measurement information 202 may be transmitted "concurrently" (i.e., overlapping in time) with the flow of outgoing data packets 201, during the data session 240. Thus, the quality of the network infrastructure 250 may be determined in real-time. Furthermore, because the data session 240 is maintained, the network measurement information 202 may be transmitted along the same data path (within the network infrastructure 250) traversed by the data packets 201. Accordingly, the network system 200 provides a more accurate determination of the quality of the actual data path traversed by the data packets 201. An additional advantage of the network system 200 is that the network device 220 may simply loop-back network measurement information 202 without interpreting it. Thus, all of the processing and provisioning of network measurement information 202 may be localized within the network device 210.

It should be noted that each of the network devices 210 and 220 may transmit network measurement information, concurrently, to be looped-back by the network devices 220 and 210, respectively. Thus, the quality of the network infrastructure 250 may be determined (and viewed) at either (or both) ends of the network 200, at any given time.

Figure 3:
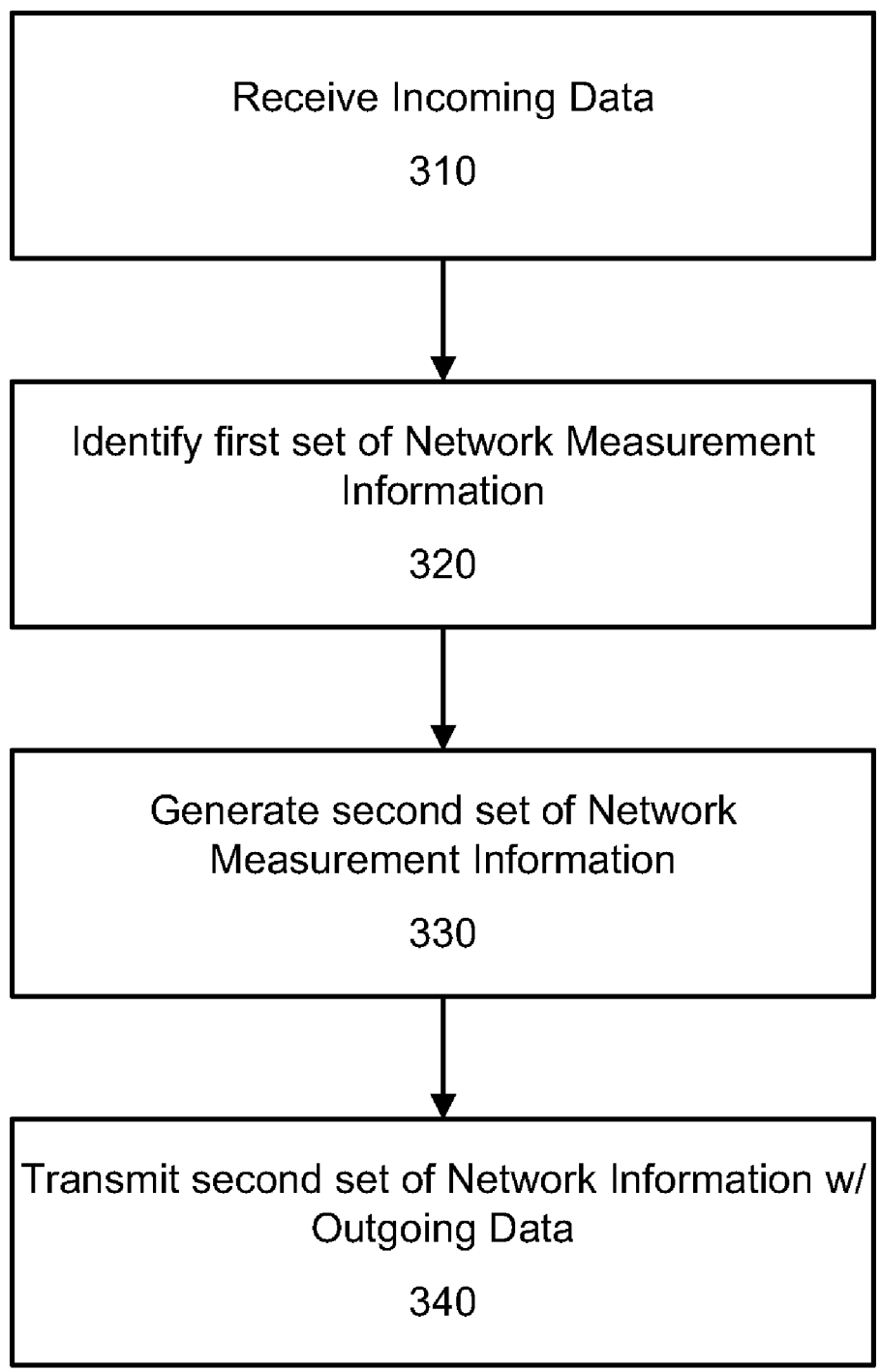
FIG. 3 illustrates an operation of a network device, according to an embodiment.

FIG. 3 illustrates an operation of a network device, according to an embodiment. At 310, the network device receives incoming data from the network. Then at 320, the network device identifies a first set of network measurement information from the incoming data. According to an embodiment, the network device continuously parses the incoming data for purposes of identifying network measurement information. For example, the network device may identify the network measurement information based on the header information of a corresponding data packet (e.g., wherein the header information specifies a location of the network measurement information within the payload of the packet). According to another embodiment, the network device may check the incoming data at regular intervals for network measurement information (e.g., assuming the network measurement information is transmitted periodically). For example, the network device may preserve power by parsing every fifth data packet received for network measurement information. In another example, the network device may parse the incoming data for network measurement information every fifth clock cycle.

At 330, the network device generates a second set of network measurement information. According to an embodiment, the network device generates the second set of network measurement information by simply extracting one or more measurement parameters from the first set of network measurement information, without interpreting the first set of network measurement information. According to another embodiment, the network device may generate one or more additional measurement parameters to be included in the second set of network measurement information. It should be noted that, in alternative embodiments, the second set of network measurement information may include any number of additional measurement parameters useful in determining a quality of the network.

The network device finally transmits the second set of network information, together with outgoing data, at 340. According to an embodiment, the network device writes the second set of network measurement information to an outgoing data packet which has already been provisioned for the current data session (e.g., a CCM packet, or other type of Operations Administration and Maintenance, also known as "OAM," packet defined by the IEEE 802.1ag draft standard and ITU Y.1731). Alternatively, the network device may generate a new network measurement packet, which includes the second set of network measurement information, and then transmit the network measurement packet in sequence with one or more outgoing data packets (e.g., during one or more empty intervals). It should be noted that, in an embodiment, the network device simply loop-back the first set of network measurement information, without interpreting it. However, in alternative embodiments, the network device may interpret the first network measurement information to determine a quality of the network.

It is important to note that, depending on the availability of a specific outgoing data packet (e.g., a CCM packet and/or a data packet provisioned at a given spatial/temporal interval) or a given interval (e.g., of time or data) in the outgoing data, the network device may not be able to transmit the second set of network measurement information as soon as it is generated. Thus, according to an embodiment, the network device may (temporarily) store the second set of network measurement information until it may be transmitted without interrupting the flow of outgoing data.

Figure 4B:
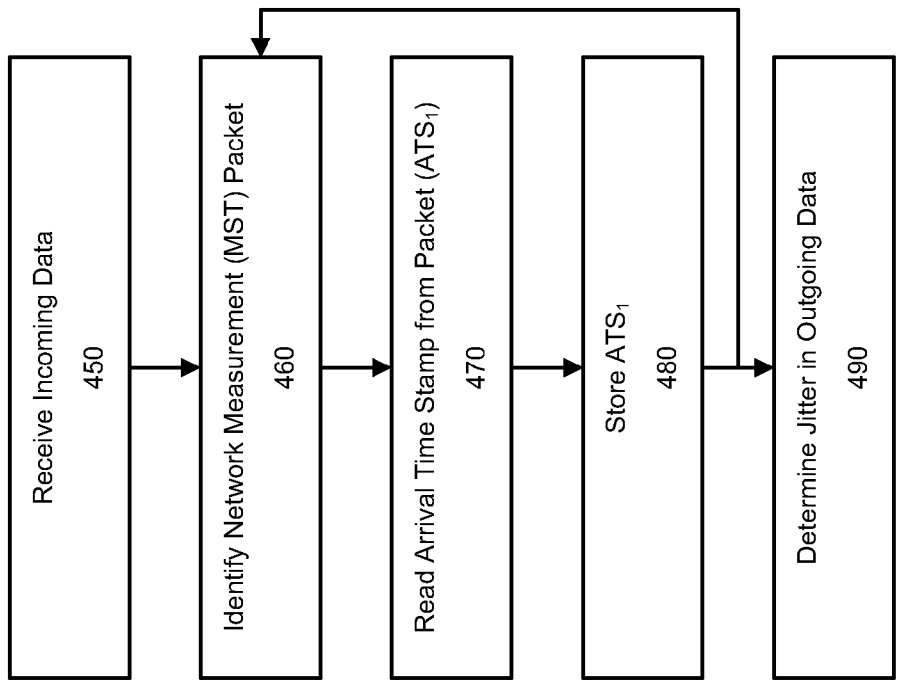
FIGS. 4A-4B illustrate an operation for determining the packet jitter of a network, according to an embodiment.
Figure 4A:
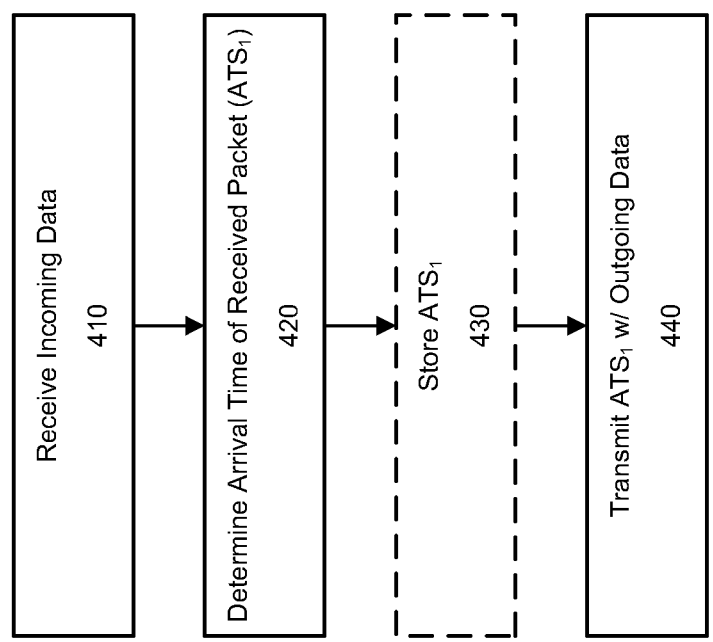

FIG. 4A illustrates a first operation for determining the packet jitter of a network, according to an embodiment. Packet jitter generally refers to individual packet delay variations, which correspond to differences in the arrival times of incoming data packets.

At 410, incoming data is received from the network. Then at 420, an arrival time of a received packet is determined. For example, upon receiving an incoming packet, a "first" network device on the network (e.g., the network device 220) may generate an arrival "time-stamp" ($ATS_1$) indicating the time at which the corresponding packet arrives at the first network device. According to an embodiment, an $ATS_1$ value is determined for any (i.e., arbitrary) incoming data packet. In an alternative embodiment, an $ATS_1$ value may be determined only for network measurement (MST) packets. For purposes of discussion, it is assumed that an MST packet corresponds to any packet containing network measurement information.

It should be noted that, depending on the availability of a specific outgoing data packet or a given interval (e.g., of time or data) in the outgoing data, the $ATS_1$ value may not be transmitted as soon as it is determined (e.g., generated). Thus, in an optional embodiment, the $ATS_1$ value may be stored, at 430, to be transmitted at a later time.

Then at 440, the $ATS_1$ value is transmitted to the network, without interrupting a flow of outgoing data. According to an embodiment, the $ATS_1$ value is written to an outgoing data packet which has already been provisioned for the current data session (i.e., the particular outgoing data packet thus becoming an outgoing MST packet). Alternatively, a new MST packet may be generated for the dedicated purpose of carrying the $ATS_1$ value back to the network.

FIG. 4B illustrates a second operation for determining the jitter of a network, according to another embodiment. At 450, incoming data is received from the network. Then at 460, an MST packet is identified from the incoming data. According to an embodiment, an MST packet is identified based on a corresponding ATS value (e.g., included in a data, or header, field of the MST packet). In another embodiment, an MST packet may be identified as any data packet containing network measurement information. However, for purposes of discussion, it should be noted that the network measurement information includes at least an ATS value. According to an embodiment, the incoming data is continuously parsed for purposes of identifying an MST packet. In an alternative embodiment, the incoming data may be periodically checked (e.g., at regular intervals, according to an amount of elapsed data and/or time) for an MST packet.

At 470, an arrival time of the received MST packet is determined. For example, the arrival time may be determined by interpreting (e.g., "reading") an $ATS_1$ value, which indicates the time at which a previously-transmitted MST packet (e.g., transmitted by the network device 210) was received by the first device on the network (e.g., the network device 220). Steps 460-480 are then repeated until a sufficient number of $ATS_1$ values (e.g., at least three) are recorded within a data buffer.

At 490, when the data buffer includes a sufficient number of $ATS_1$ entries, the packet jitter in the outgoing data may be determined. For example, the packet jitter in the transmitted data packets may be calculated as: Jitter=$[ATS_{1,1}-ATS_{1,2}]-[ATS_{1,2}-ATS_{1,3}]$, wherein the subscript "X" (i.e., $ATS_{1,x}$) denotes the order in which corresponding $ATS_1$ values are recorded. In an embodiment, a "running" (e.g., continuous) jitter determination is performed, at 650. For example, the data buffer may be a first-in-first-out ("FIFO") register. Thus, a subsequent jitter in the transmitted data packets may be calculated as: Jitter=$[ATS_{1,2}-ATS_{1,3}]-[ATS_{1,3}-ATS_{1,4}]$.

It should be noted that, although a specific example for calculating packet jitter has been described, there may be many other possible ways to determine the jitter of a network using the received network measurement information (e.g., Jitter=$[ATS_{1,2}-ATS_{1,1}]-[ATS_{1,3}-ATS_{1,2}]$).

Figure 5A:
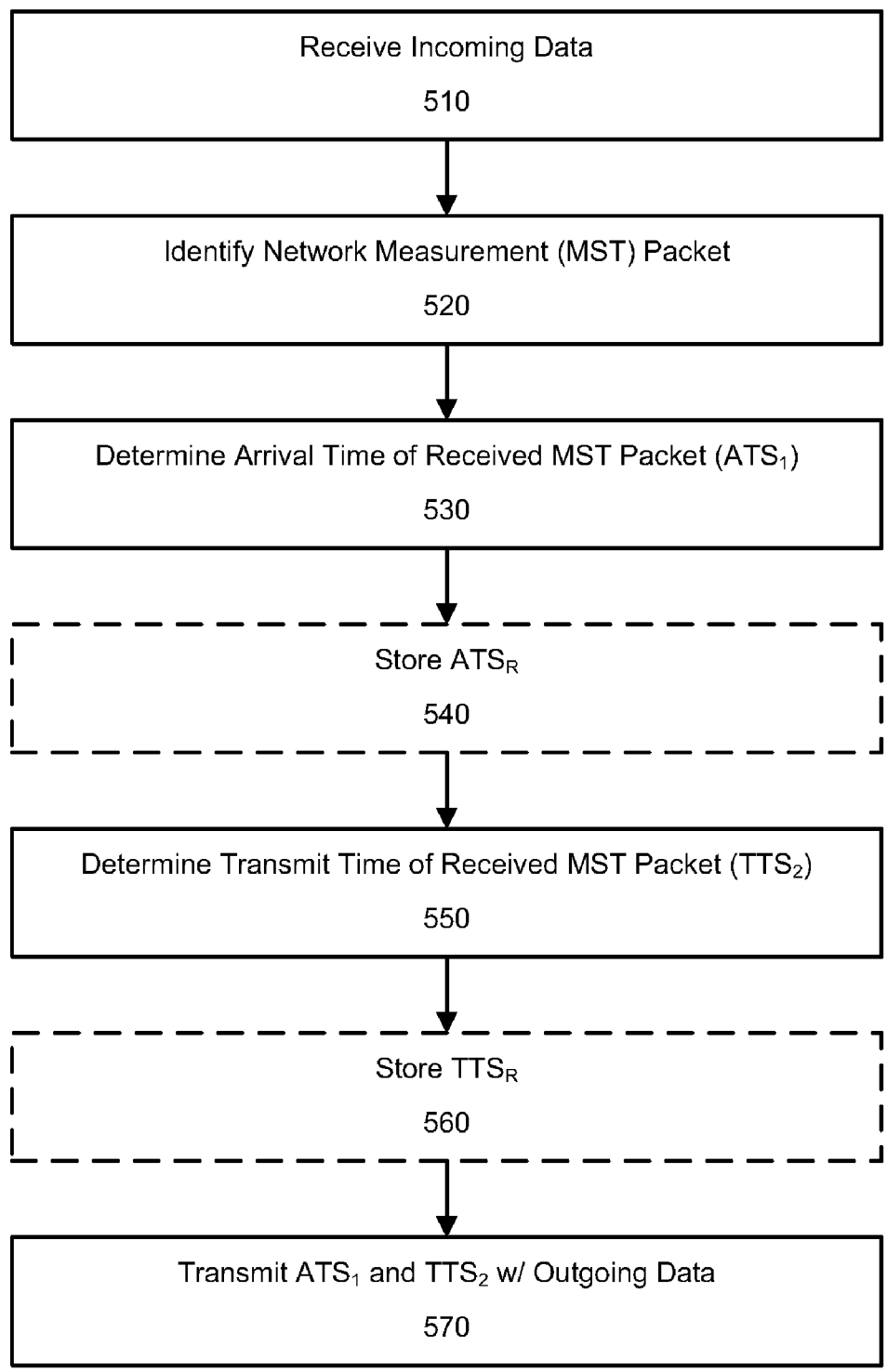
FIGS. 5A-5B illustrate an operation for determining the delay of a network, according to an embodiment.

FIG. 5A illustrates a first operation for determining the delay of a network, according to an embodiment. Round-trip delay generally refers to the time it takes a data packet to traverse a network, from one end to another and back.

At 510, incoming data is received from the network. Then at 520, an MST packet is identified from the incoming data. According to an embodiment, the MST packet is identified based on a corresponding transmit time stamp (TTS) value (e.g., included in a data, or header, field of the MST packet). In another embodiment, an MST packet may be identified as any data packet containing network measurement information. However, for purposes of discussion, it should be noted that the network measurement information includes at least a TTS value. According to an embodiment, the incoming data is continuously parsed for purposes of identifying an MST packet. In an alternative embodiment, the incoming data may be checked, periodically, for an MST packet.

At 530, an arrival time of the received MST packet is determined. For example, the arrival time may correspond to an $ATS_1$ value generated by a first network device (e.g., the network device 220) upon receiving the corresponding MST packet. It should be noted that, depending on the availability of a specific outgoing data packet or a given interval in the outgoing data, the $ATS_1$ value may not be able to be transmitted as soon as it is determined (e.g., generated). Thus, in an optional embodiment, the $ATS_1$ value may be stored, at 540, to be transmitted at a later time.

At 550, a transmit time of the received MST packet is determined. For example, the transmit time may be determined by reading a $TTS_2$ value, which indicates the time at which the received MST packet was transmitted by a "second" device on the network (e.g., the network device 210). It should be noted that, depending on the availability of a specific outgoing data packet or a given interval (e.g., of time or data) in the outgoing data flow, the $TTS_2$ value may not be transmitted as soon as it is determined. Thus, in an optional embodiment, the $TTS_2$ value may be (temporarily) stored, at 550, to be transmitted at a later time.

Then at 570, the $ATS_1$ and $TTS_2$ values are transmitted to the network, without interrupting a flow of outgoing data. According to an embodiment, the $ATS_1$ and $TTS_2$ values are written to an outgoing data packet which has already been provisioned for the current data session (i.e., the particular outgoing data packet thus becoming an outgoing MST packet). In an alternative embodiment, a new MST packet may be created for the dedicated purpose of transmitting the $ATS_1$ and $TTS_2$ values back to the network. According to another embodiment, the output MST packet may include additional information, indicating the time at which the output MST packet is transmitted to the network. For example, a $TTS_1$ value, which indicates the time at which the outgoing MST packet is transmitted by the first network device (e.g., the network device 220), may be transmitted with the network measurement information.

According to an alternative embodiment, a device turn-around-time (TAT) may be transmitted with the outgoing MST packet. For example, the TAT value may correspond to the elapsed time from when the first network device (e.g., the network device 220) receives an incoming MST packet to when the first network device transmits an outgoing MST packet (i.e., TAT=$TTS_1-ATS_1$). Thus, the TAT value may be transmitted in lieu of both the $ATS_1$ and $TTS_1$ values. It should be noted that, for purposes of discussion, network measurement information may include any (or all) of the time-stamp values (e.g., $TTS_1$, $TTS_2$, $ATS_1$, and/or TAT).

Figure 5B:
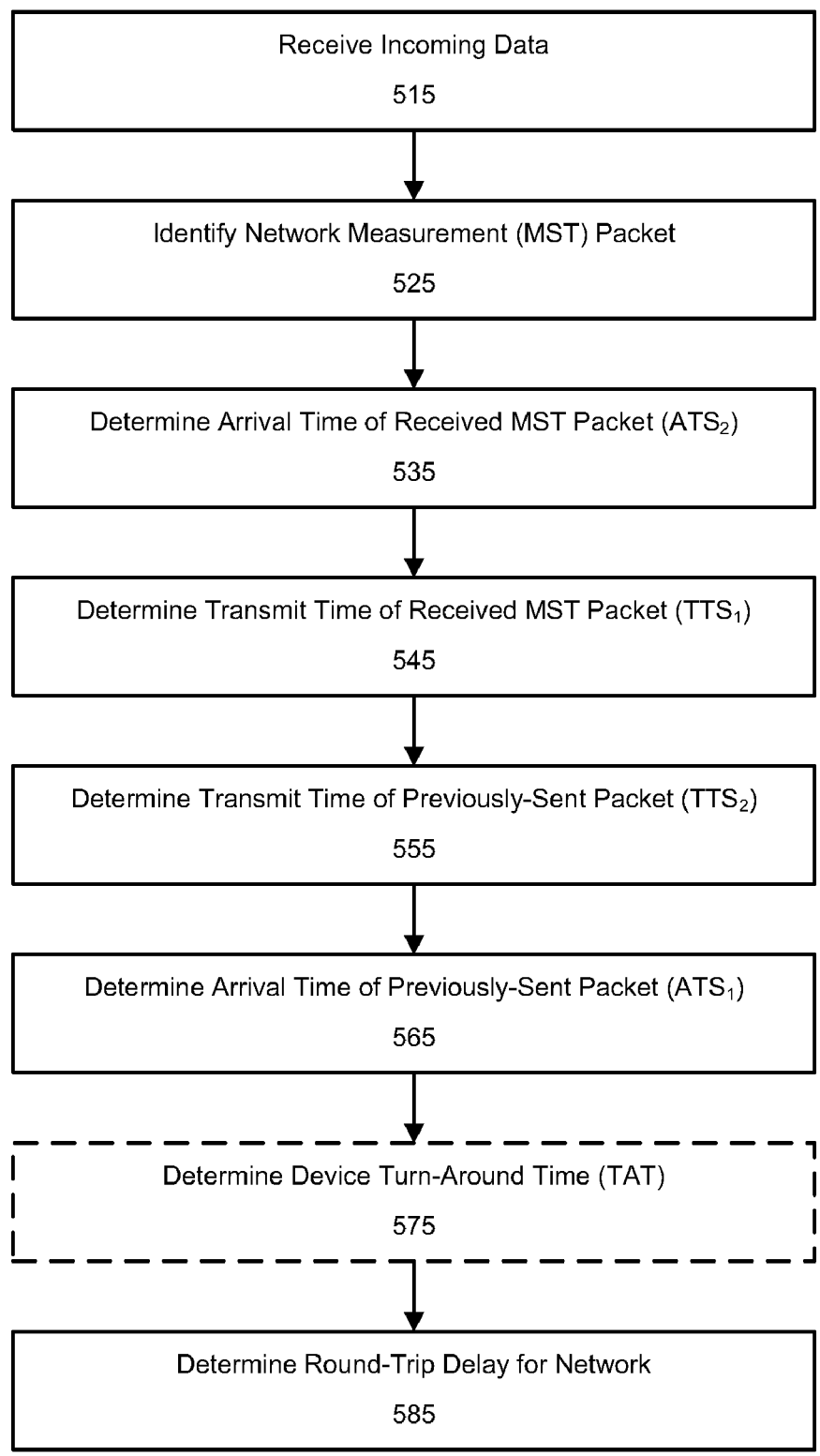

FIG. 5B illustrates a second operation for determining the delay of a network, according to an embodiment. At 515, incoming data is received from the network. Then at 525, an MST packet is identified from the incoming data. According to an embodiment, an MST packet is identified by at least one of a TTS, ATS, and/or TAT value (e.g., included in a data, or header, field of the received MST packet). In another embodiment, an MST packet may be identified as any data packet containing network measurement information. However, for purposes of discussion, it should be noted that the network measurement information includes at least a TTS, ATS, and/or TAT value. According to another embodiment, the incoming data is continuously parsed for purposes of identifying an MST packet. In an alternative embodiment, the incoming data may be checked, periodically, for an MST packet.

At 535, arrival time of the received MST packet is determined. For example, the arrival time may correspond to an $ATS_2$ value generated by the second network device (e.g., the network device 210) upon receiving the corresponding MST packet. Next, the transmit time of the received MST packet ($TTS_1$) is determined along with the transmit and arrival times of a previously-transmitted MST packet ($TTS_2$ and $ATS_1$) at 545, 555, and 565, respectively. For example, each of the $TTS_1$, $TTS_2$, and $ATS_1$ values may be read directly from the received MST packet. For purposes of discussion, the subscript "1" denotes a time-stamp generated by the "first" network device (e.g., the network device 220), and the subscript "2" denotes a time-stamp generated by the "second" network device (e.g., the network device 210).

In an alternative embodiment, a TAT value may be determined, at 575. For example, the TAT value may be read directly from the received MST packet. Alternatively, the TAT value may be calculated by the second network device, according to the equation: $TAT=TTS_1-ATS_1$.

A round-trip delay for the network may thus be determined, at 585, using the received network measurement information. According to an embodiment, the round-trip delay corresponds to the time it takes to transmit a data packet from on end of the network to another, and back (i.e., not including the turn-around times at either end). For example, the round-trip delay may be calculated (e.g., by the second network device) as: $Delay=[ATS_2-TTS_2]-[TTS_1-ATS_1]$. Alternatively, the round-trip delay may be calculated as: $Delay=ATS_2-TTS_2-TAT$.

It should be noted that, although a specific example of round-trip delay has been described, there may be many other possible ways to determine a network delay using the received network measurement information. For example, it may be desirable to determine the overall response time of one or more end devices on the network (i.e., $Delay=ATS_2-TTS_2$).

An advantage of the foregoing embodiments, with respect to FIGS. 4 and 5, is that the first operations (e.g., FIGS. 4A and 5A) may be performed within one end device (e.g., network device 220) while the second operations (e.g., FIGS. 4B and 6B) may be performed within another end device (e.g., network device 210). In this manner, all of the processing and interpreting of network measurement information is performed at one end of the network, while a device at the other end simply loops-back received network measurement information (i.e., no processing or knowledge of how to interpret the network measurement information is required).

Figure 6:
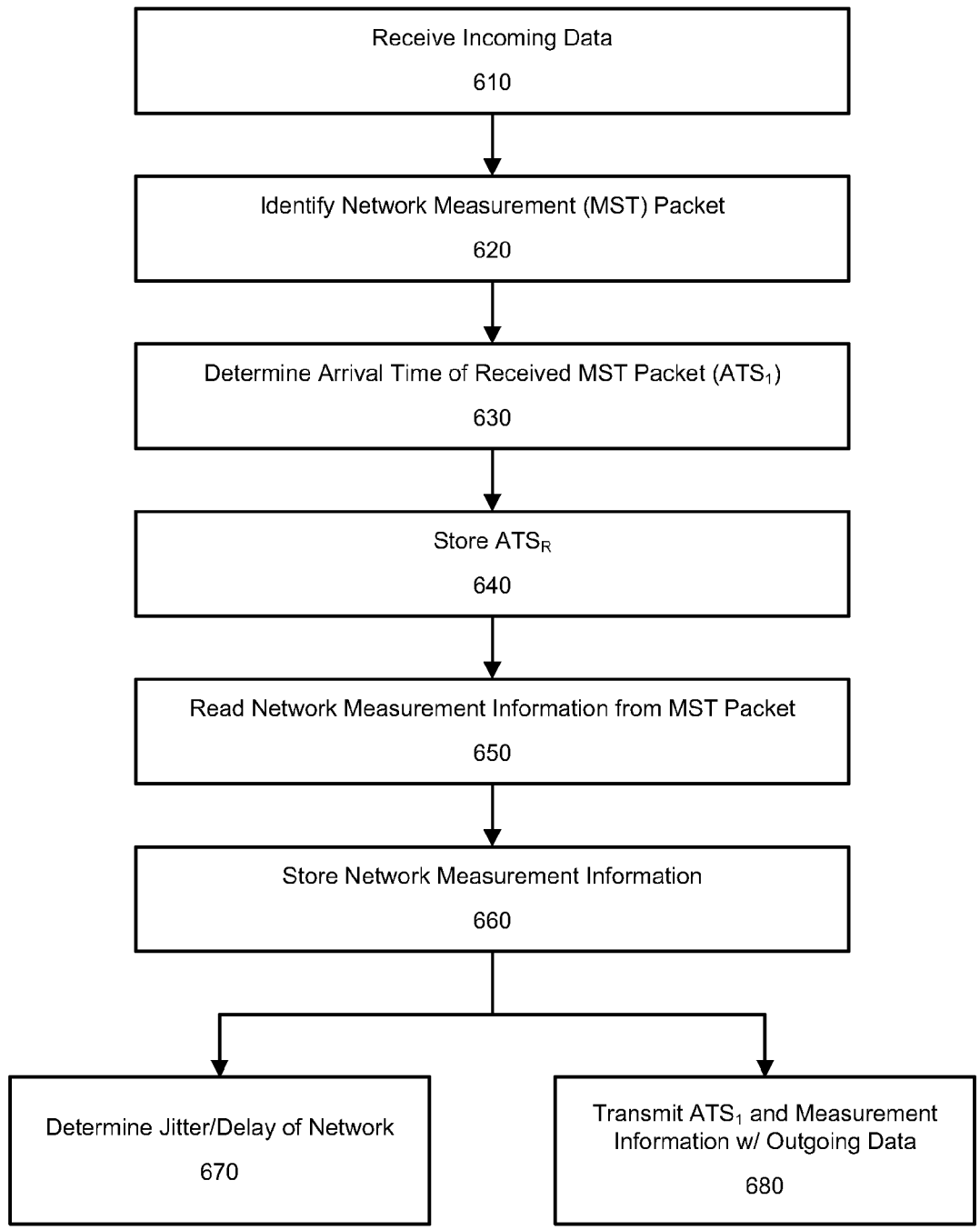
FIG. 6 illustrates an operation for determining the jitter and/or delay of a network, according to another embodiment.

FIG. 6 illustrates an operation for determining the jitter and/or delay of a network, according to another embodiment. At 610, incoming data is received from the network. Then at 620, an MST packet is identified from the incoming data. For purposes of discussion, it is assumed that the MST packet corresponds to any data packet containing network measurement information. According to an embodiment, incoming data is continuously parsed for purposes of identifying an MST packet. According to another embodiment, the incoming data may be checked, periodically, for an MST packet.

At 630, an arrival time for the received MST packet is determined. For example, the arrival time may correspond to an $ATS_1$ value generated by a first network device (e.g., either network device 210 and/or network device 220) upon receiving the corresponding MST packet. According to an embodiment, the $ATS_1$ value may be stored, at 640, to be interpreted and/or transmitted at a later time. For example, a number of $ATS_1$ values may be stored (e.g., in sequence) for use in determining a jitter in the incoming data.

At 650, network measurement information is read from the MST packet. For example, the network measurement information may include $TTS_1$, $TTS_2$, $ATS_2$, and/or TAT values. According to an embodiment, the network measurement information may be stored, at 660, to be interpreted and/or transmitted at a later time. For example, a number of $ATS_2$ values may be stored for use in determining a jitter in the outgoing data. In an alternative embodiment, only selected parameters of the network measurement information may be stored, at 660.

A jitter and/or delay for the network are determined, at 670, using the received network measurement information. For example, a round-trip delay for the network may be calculated as: $Delay=[ATS_1-TTS_1]-[TTS_2-ATS_2]$. In another example, jitter in the outgoing (i.e., "upstream") data may be calculated as: $Jitter=[ATS_{2,1}-ATS_{2,2}]-[ATS_{2,3}-ATS_{2,4}]$, wherein the subscript "X" (i.e., $ATS_{2,X}$) denotes the order in which the corresponding $ATS_2$ values are recorded. In yet another example, jitter in the incoming (i.e., "downstream") data may be calculated as: $Jitter=[ATS_{1,1}-ATS_{1,2}]-[ATS_{1,3}-ATS_{1,4}]$, wherein the subscript "X" (i.e., $ATS_{1,X}$) denotes the order in which the corresponding $ATS_1$ values are recorded.

Then at 680, the $ATS_1$ value and (one or more selected parameters in) the received network measurement information are transmitted to the network, as outgoing network measurement information, without interrupting a flow of outgoing data. According to an embodiment, the outgoing network measurement information is written to an outgoing data packet which has already been provisioned for the current data session. In an alternative embodiment, a new MST packet may be created for the dedicated purpose of transmitting the outgoing network measurement information back to the network.

An advantage of the foregoing embodiments, with respect to FIG. 6, is that the same operation(s) for determining the jitter and/or delay of a network may be carried out by two end devices on a network (e.g., both the network devices 210 and 220), thus reducing programming and/or manufacturing costs. In addition both upstream and/or downstream qualities of the network may be determined (and viewed) at either (or both) ends of the network.

FIG. 7A illustrates a first operation for determining the throughput of a network, according to an embodiment. Data throughput generally refers to the amount of data (e.g., packets or bytes) received at one end of the network, during a given interval. At 710, incoming data is received from the network. Then at 720, the start of a data count is determined. According to an embodiment, the start of the data count may correspond with a reception (i.e., identification) of a received MST packet (e.g., based on network measurement information included in a data, or header, field of the MST packet). For example, the incoming data may be continuously parsed for purposes of identifying an MST packet. Alternatively, the incoming data may be checked, periodically, for an MST packet. According to another embodiment, the start of the data count may correspond with a predetermined amount of elapsed time (e.g., coinciding with every fifth clock cycle).

At 730, the incoming data is counted. For example, the total number of received data packets may be counted. Alternatively, the total number of received bits (or bytes) of data may be counted. According to an embodiment, the data count is continuously updated until a subsequent MST packet is received (i.e., identified). According to another embodiment, the data count may be updated for a predetermined interval of time. According to yet another embodiment, a running count of the incoming data may be continuously updated, and sampled (i.e., stored) each time an MST packet is received. For example, a Count1 value may be stored the first time an MST packet is received and a Count2 value may be stored the next time an MST packet is received. The data count may thus be determined based on the difference between the sampled count values (e.g., Data Count=Count2−Count1). Continuing from the previous example, the Count1 value may then be updated with the Count2 value (i.e., Count1=Count2), and a new Count2 value may be recorded the next time an MST packet is received. It should be noted that a received MST packet (e.g., triggering the start and/or of the data count) may or may not be included as part of the data count.

It should be noted that, depending on the availability of a specific outgoing data packet or a given interval in the outgoing data, the data count may not be transmitted as soon as it is determined (i.e., as soon as the count is completed). Thus, in an optional embodiment, the data count may be stored, at 430, to be transmitted at a later time.

At 750, a data count ($DC_1$) value for a first network device (e.g., the network device 220) is transmitted to the network (e.g., as outgoing network measurement information), without interrupting a flow of outgoing data. According to an embodiment, the outgoing data count is written to an outgoing data packet which has already been provisioned for the current data session. In an alternative embodiment, a new MST packet may be created for the dedicated purpose of transmitting the data count back to the network.

FIG. 7B illustrates a second operation for determining the throughput of a network, according to an embodiment. At 760, incoming data is received from the network. Then at 770, an MST packet is identified from the incoming data. According to an embodiment an MST packet is identified based on a corresponding DC value (e.g., included in a data, or header, field of the received MST packet). In another embodiment, an MST packet may be identified as any data packet containing network measurement information. However, for purposes of discussion, it is assumed the network measurement information includes at least a DC value. According to another embodiment, incoming data is continuously parsed for purposes of identifying an MST packet. In an alternative embodiment, the incoming data may be checked, periodically, for an MST packet.

At 780 a $DC_1$ value is read from the received MST packet. For example, the $DC_1$ value may indicate the total number of data packets successfully received by the first network device (e.g., the network device 220) within a given interval. Alternatively, the $DC_1$ value may indicate a total number of data bits (or bytes) successfully received by the first network device within a given interval.

Then at 790, the data throughput for the outgoing data is determined. For example, the data throughput may be calculated as: Throughput=$DC_1$/[Transmission Interval]. According to an embodiment, the transmission interval may correspond to a predetermined (e.g., fixed) interval of time during which the $DC_1$ value was updated. In an alternative embodiment, the transmission interval may be determined based on a measure of elapsed time between two MST packets (e.g., based on a difference between two respective ATS values).

In an embodiment, the amount of outgoing data lost along the network (e.g., a "data loss" of the network) may also be determined using the data count value. For example, the second network device (e.g., the network device 210) may record the number of bytes transmitted to the first network device (e.g., the network device 220) during a transmission interval. Thus, the second network device may determine the amount of data lost along the network by matching the record of the number of bytes transmitted with the appropriate $DC_1$ value, according to the equation: Data Loss=[Bytes Transmitted]−$DC_1$. According to an embodiment, the record may be stored internally (e.g., with an accompanying TTS value for purposes of identifying a corresponding MST packet). According to an alternative embodiment, the record may be transmitted with a corresponding MST packet (e.g., as part of the network measurement information), and thus looped-back with a corresponding $DC_1$ value. In this manner, an amount of data lost during each transmit interval may be "mapped to" (i.e., correlated with) an amount of data transmitted.

Figure 7:
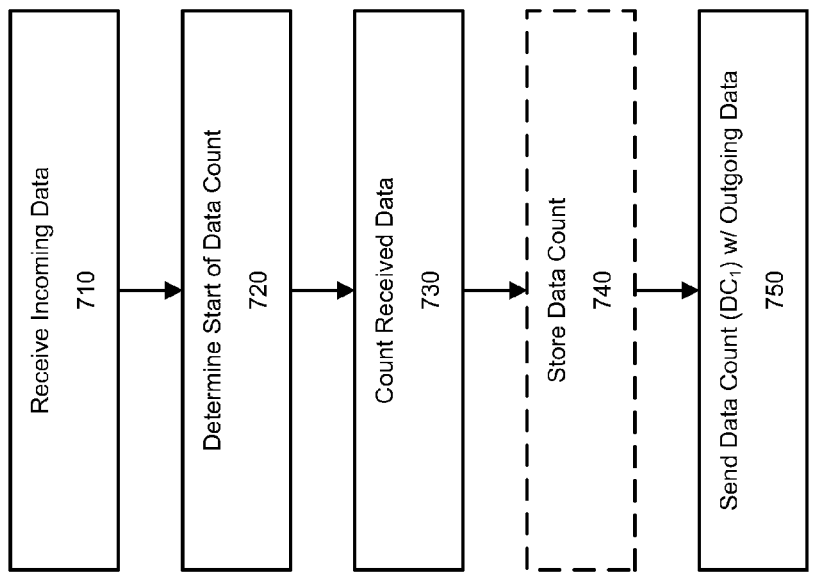
FIGS. 7A-7B illustrate an operation for determining the throughput of a network, according to an embodiment.

An advantage of the foregoing embodiments, with respect to FIG. 7, is that the first operation (e.g., FIG. 7A) may be performed within one end device (e.g., network device 220) while the second operation (e.g., FIG. 7B) may be performed within another end device (e.g., network device 210), thus localizing all of the processing and interpreting of network measurement information to one end of the network.

Figure 8:
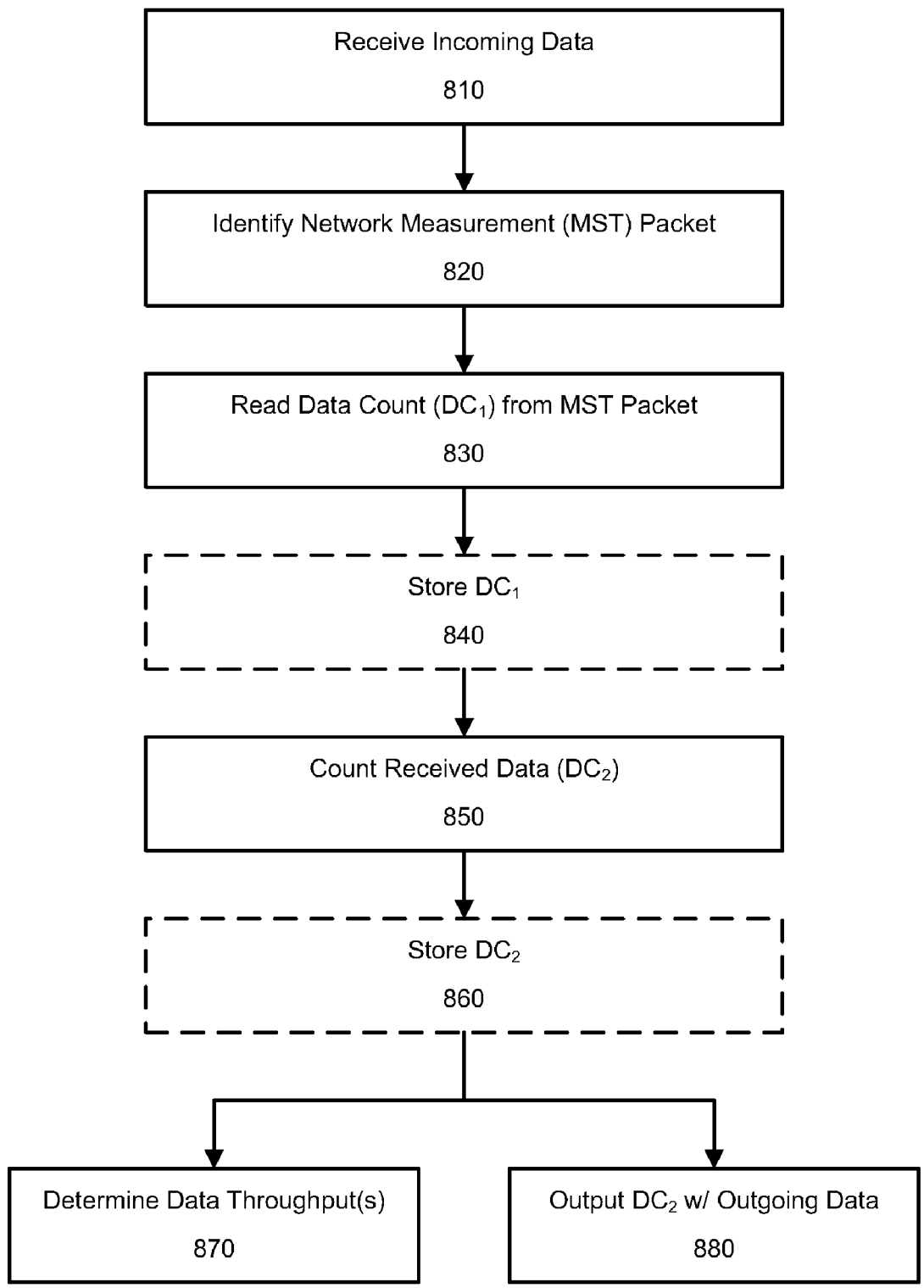
FIG. 8 illustrates an operation for determining the throughput of a network, according to another embodiment.

FIG. 8 illustrates an operation for determining the throughput of a network, according to another embodiment. At 810, incoming data is received from the network. Then at 820, an MST packet is identified from the incoming data. According to an embodiment an MST packet is identified based on a corresponding DC value (e.g., included in a data, or header, field of the received MST packet). In another embodiment, an MST packet may be identified as any data packet containing network measurement information. However, for purposes of discussion, it is assumed the network measurement information includes a data count value. According to another embodiment, incoming data is continuously parsed for purposes of identifying an MST packet. In an alternative embodiment, the incoming data is checked, periodically, for an MST packet.

At 830, a $DC_1$ value is read from the received MST packet. For example, the $DC_1$ value may indicate the total number of data packets successfully received by a first network device (e.g., either network device 210 or network device 220) within a given interval. Alternatively, the $DC_1$ value may indicate a total number of data bits (or bytes) successfully received by the first network device within a given interval. In an optional embodiment, the received $DC_1$ value may be stored, at 840, to be used for determining the data throughput of outgoing data (e.g., at a later time).

At 850, the incoming data is counted. According to an embodiment, the data count is continuously updated until a subsequent MST packet is received (i.e., identified). According to another embodiment, the data count may be updated for a predetermined interval of time. In an optional embodiment, a count of the received data ($DC_2$) may be stored, at 860, to be transmitted and/or used for determining the data throughput of incoming data. For example, the $DC_2$ value may indicate the total number of data packet successfully received by a second device (e.g., either network device 220 and/or network device 210).

The incoming and/or outgoing data throughput is thus determined, at 870, using the count values ($DC_1$ and/or $DC_2$). For example, the outgoing (e.g., upstream) data throughput may be determined as: Throughput=$DC_1$/[Transmission Interval]. In another example, the incoming data throughput may be determined as: Throughput=$DC_2$/[Transmission Interval]. According to an embodiment, the transmission interval may correspond to a predetermined interval of time during which the $DC_1$ and or $DC_2$ values are updated. In an alternative embodiment, the transmission interval may be determined based on a measure of elapsed time between subsequent MST packets.

In an embodiment, the amount of outgoing data lost along the network may be determined based on a record of the data transmitted (e.g., Data Loss=[Data Transmitted]−$DC_1$). For example, the record may be stored internally or transmitted with a corresponding MST packet (e.g., as a $DT_2$ value, indicating the amount of data being output by the second network device). In another embodiment, the amount of incoming data lost along the network may also be determined. For example, the second network device may receive a transmitted data ($DT_1$) value indicating the amount of data being transmitted by the first network device (e.g., during a given transmission interval). Thus, the second network device may calculate the amount of incoming data lost according to the equation: Data Loss=$DT_1$−$DC_2$. Thus, an amount of data lost may be mapped to an amount of data transmitted for both the outgoing and incoming data.

Then at 880, the $DC_2$ value is transmitted to the network, as outgoing network measurement information, without interrupting a flow of outgoing data. In another embodiment, a $DT_2$ value may also be transmitted (e.g., indicating the total bytes being output by the second network device during the current transmission interval). According to an embodiment, the outgoing network measurement information is written to an outgoing data packet which has already been provisioned for the current data session. In an alternative embodiment, a new MST packet may be created for the dedicated purpose of transmitting the outgoing network measurement information back to the network.

An advantage of the foregoing embodiments, with respect to FIG. 8, is that the same operation(s) for determining the data throughput of a network may be carried out by two end devices on a network (e.g., both the network devices 210 and 220), thus reducing programming and/or manufacturing costs. In addition both upstream and downstream qualities of the network may be monitored (i.e., viewed) at either end of the network.

Figure 9:
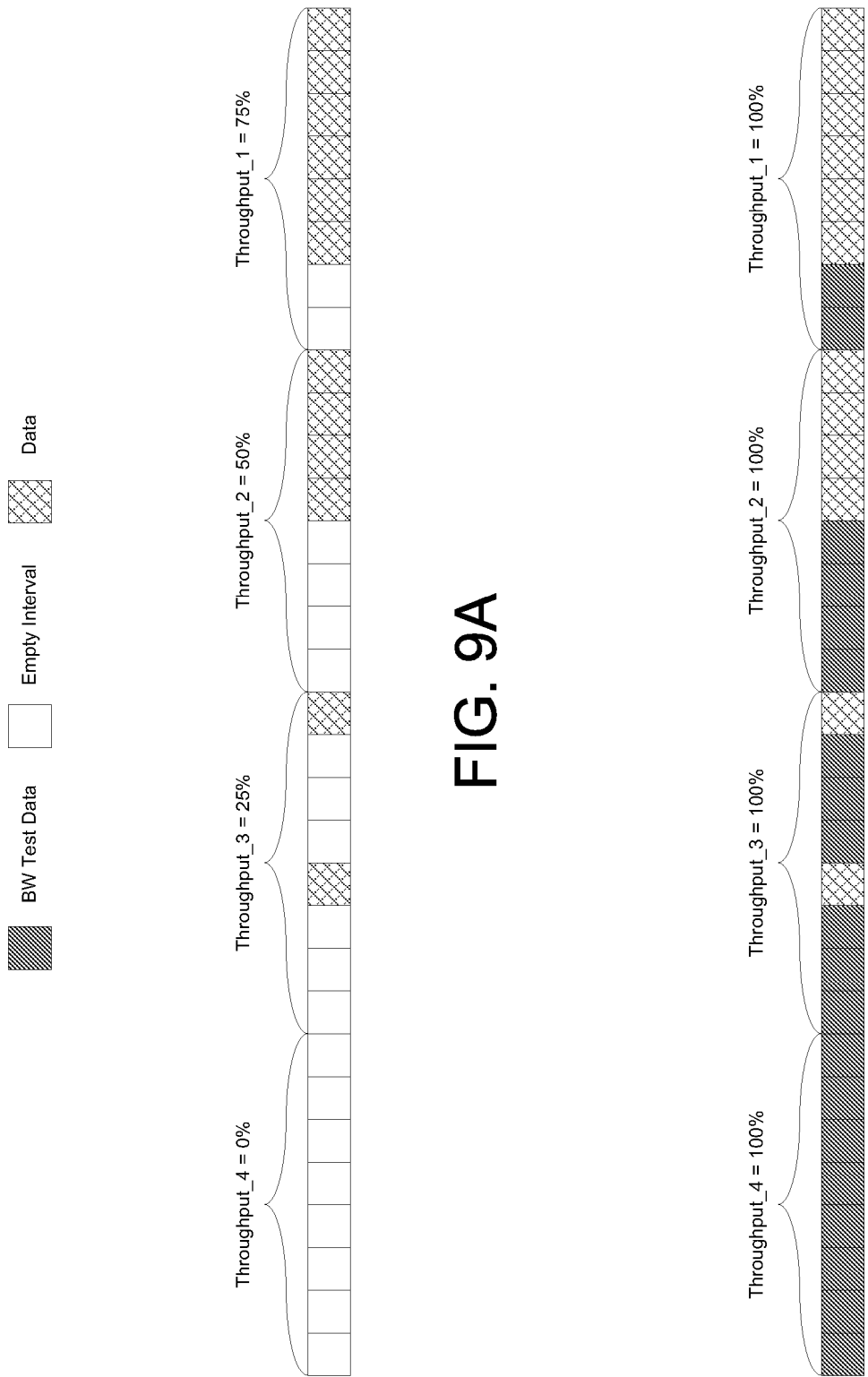
FIGS. 9A-9B illustrate a data transfer for determining the bandwidth of a network, according to an embodiment.

FIGS. 9A-9B illustrate a data transfer for determining the bandwidth of a network, according to an embodiment. In the example of FIG. 9A, four transmission intervals are shown, each including data (e.g., packets and/or bytes) and/or empty intervals of time (i.e., wherein nothing is transmitted). As shown, the first transmission interval is 75% full with data (e.g., Throughput_1=75%); the second transmission interval is 50% full (e.g., Throughput_2=50%); the third transmission interval is 25% full (e.g., Throughput_3=25%); and the fourth transmission interval is completely empty (e.g., Throughput_4=0%). Bandwidth generally refers to a maximum allowable data throughput for the network. Thus, in According to an embodiment, the bandwidth of a network may be determined by substantially maximizing the data throughput of one or more transmission intervals.

For example, as shown in FIG. 9B, the empty intervals of time are filled with bandwidth test data (e.g., packets and/or bytes) such that the data throughput during each interval is substantially maximized. According to an embodiment, a network device transmits bandwidth test data for (substantially) the duration of the empty intervals. For example, the bandwidth test data may correspond to one or more network measurement (MST) packets carrying network measurement information. Alternatively, the bandwidth test data may correspond to "junk" data disguised as one or more standard data packets (e.g., according to the header information). In this manner, a bandwidth of the network (or data path) may be determined based on a data count looped-back from another device on the network (e.g., as described with respect to FIGS. 7 and 8). For example, the maximum data throughput determined (i.e., "seen") during a given period of time may correspond to the bandwidth of the network. According to an embodiment, the bandwidth test packets may be marked as "low priority" packets, thus allowing these test packets to be dropped if the network becomes congested.

In an embodiment, the bandwidth of a network is tested periodically. In other words, for purposes of preserving bandwidth, power, and/or other system resources, a network device may not transmit bandwidth test data during every transmit interval (e.g., the data throughput of every fifth transmit interval may be maximized). However, it should be noted that the bandwidth of the network may still be determined, in this embodiment, based on the maximum data throughput seen during a given period of time (e.g., within the duration of five or more transmit intervals).

Figure 10:
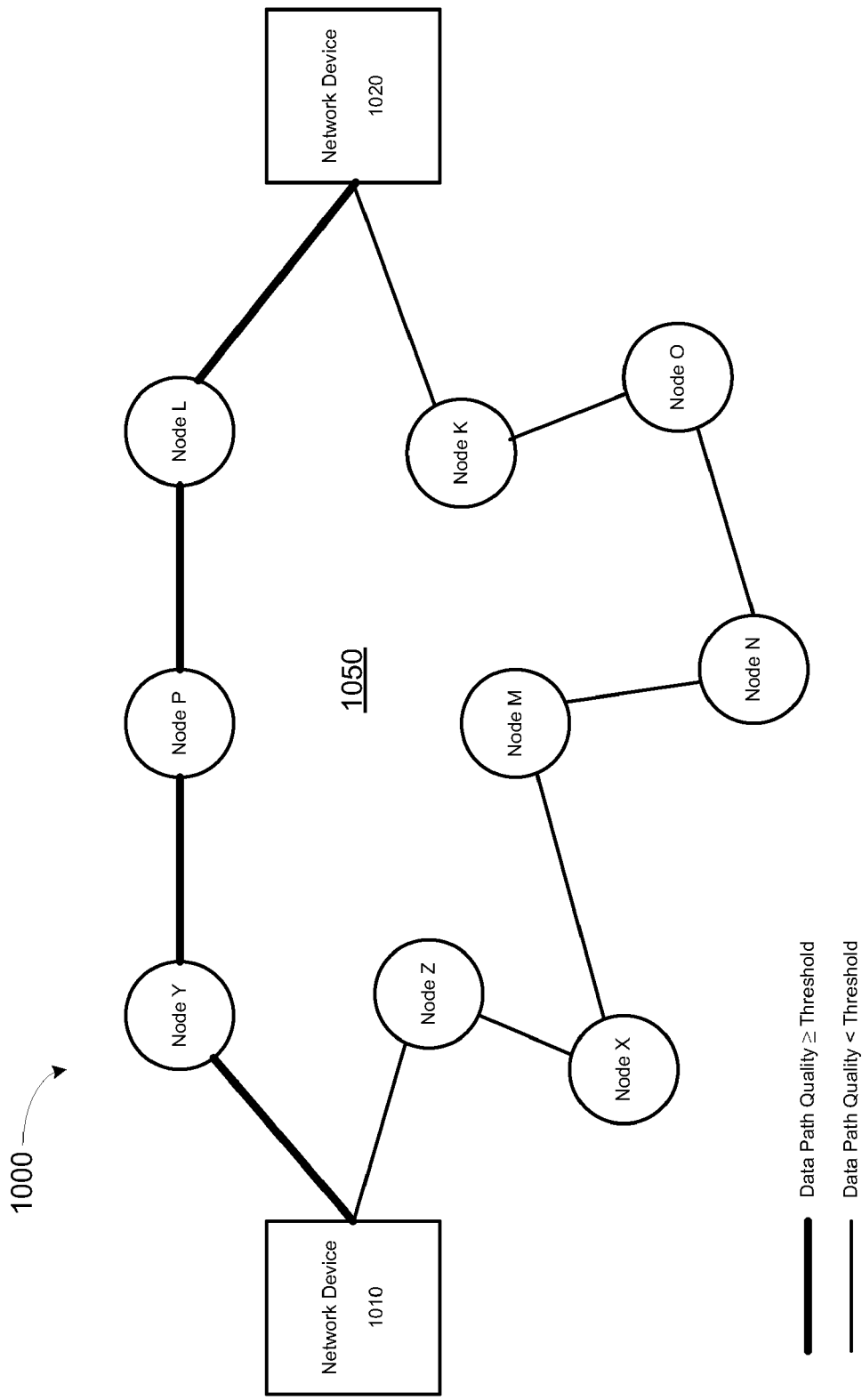
FIG. 10 illustrates a network system according to another embodiment.

FIG. 10 illustrates a network system 1000 according to another embodiment. The network system 1000 includes two network devices, 1010 and 1020, connected to one another via a network infrastructure 1050. The network infrastructure, in this example, is made up of the "nodes" X, Y, Z, M, N, O, P, K, and L. For purposes of discussion, it is assumed that each of the nodes corresponds to an intermediate device on the network (e.g., routers, switches, repeaters, and/or terminals). The nodes Z, X, M, N, O, and K form a first data path for communications between the network devices 1010 and 1020. Similarly, the nodes Y, P, and L form a second data path for communications between the network devices 1010 and 1020. It should be noted that communications on each of the data paths may be bidirectional.

In an example, the quality of the first data path (Z-X-M-N-O-K) is below a threshold value. On the other hand, the quality of the second data path (Y-P-L) is above, or equal to, the threshold value. For example, the threshold value may correspond to a "guaranteed" level of quality for the network (e.g., based on a jitter, delay, throughput, bandwidth, and/or data loss determination). According to an embodiment, the second data path corresponds to a protective circuit having a network quality that is above, or equal to, the threshold level. For example, the second data path may have a predetermined network quality (e.g., the quality of the second data path may be tested, according to the embodiments described with respect to FIGS. 4-9).

According to an embodiment, a data session that is initially established along the first data path may be "switched-over" (e.g., re-established) to the second data path upon determining that the quality of the first data path (i.e., upon determining that the quality of the first data path is below the threshold value). It should be noted that the data session may be re-established on the second data path prior to (or concurrently with) terminating the data session on the first data path, thus allowing for a "seamless" transition from one data path to the other (i.e., minimizing data loss during the transition). In an embodiment, the data communication is switched over if at least one of the network quality parameters (e.g., jitter, delay, throughput, bandwidth, and/or data loss determination) for the first data path (Z-X-M-N-O-K) is below a given threshold level. Alternatively, the data communication may be switched over if all (or a combination) of the quality parameters for the first data path (Z-X-M-N-O-K) are below a respective threshold level. It should be noted that the threshold level(s) may be user-defined.

Figure 11:
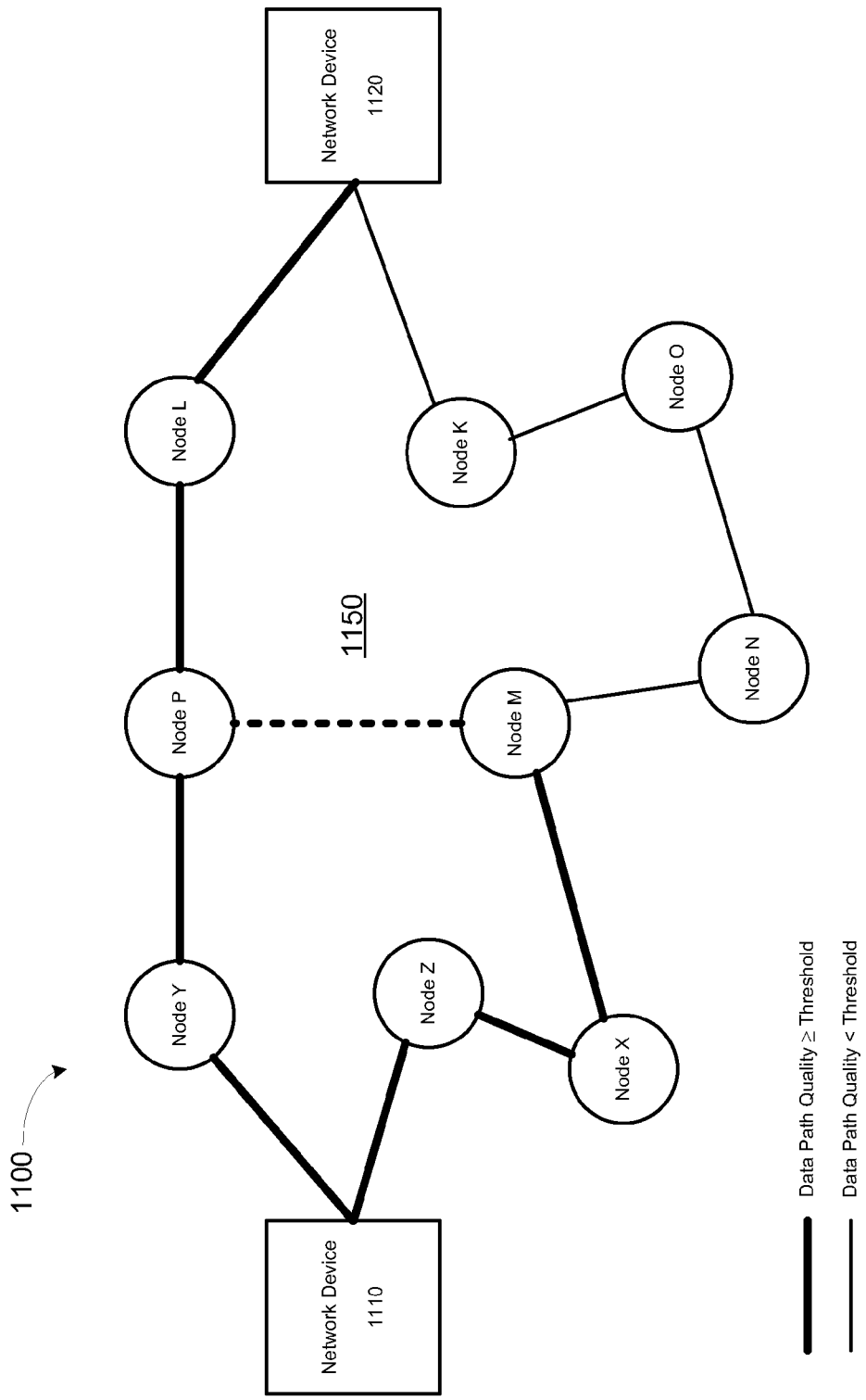
FIG. 11 illustrates a network system according to yet another embodiment.

FIG. 11 illustrates a network system 1100 according to yet another embodiment. The network system 1100 includes two network devices, 1110 and 1120, connected to one another via a network infrastructure 1150. The network infrastructure, in this example, is made up of the "nodes" X, Y, Z, M, N, O, P, K, and L. The nodes Z, X, M, N, O, and K form a first data path for communications between the network devices

1010 and 1020. Similarly, the nodes Y, P, and L form a second data path for communications between the network devices 1010 and 1020. It should be noted that communications on each of the data paths may be bi-directional.

In an example, the quality of a segment of the first data path (i.e., Z-X-M) is above, or equal to, the threshold value. In contrast, the quality of another segment of the first data path (i.e., N-O-K) is below the threshold value. For example, the threshold value may correspond to a "guaranteed" level of quality for the network (e.g., based on a jitter, delay, throughput, bandwidth, and/or data loss determination). Thus, the network quality measured (i.e., determined) at either of the network devices, 1110 and/or 1120, may indicate that the quality of the first data path (Z-X-M-N-O-K) is short of a threshold value, when in fact only the right-hand segment of the first data path (i.e., N-O-K) is the cause for a bottleneck in performance.

According to an embodiment, rather than re-provision all of the network resources within the network infrastructure 1150, a new network segment (e.g., P-L) may be allocated to replace only a selected segment (e.g., N-O-K) of the problematic data path (i.e., upon determining that the quality of the selected data path segment is below a threshold value). For example, the new network segment may have a predetermined network quality (e.g., the quality of the new network segment may be tested, according to the embodiments described with respect to FIGS. 4-9). Thus, as shown in FIG. 11, a new data path between the network devices 1110 and 1120 may be made up of nodes Z, X, M, P, and L.

It should be noted that the data session may be re-established on the new network segment prior to (or concurrently with) terminating the data session on the selected segment of the first data path, thus allowing for a "seamless" transition from one network segment to the other. In an embodiment, the data communication is switched over if at least one of the quality parameters for the selected segment (N-O-K) is below a given threshold level. Alternatively, the data communication may be switched over if all (or a combination) of the quality parameters for the selected segment (N-O-K) are below a respective threshold level.

Figure 12:
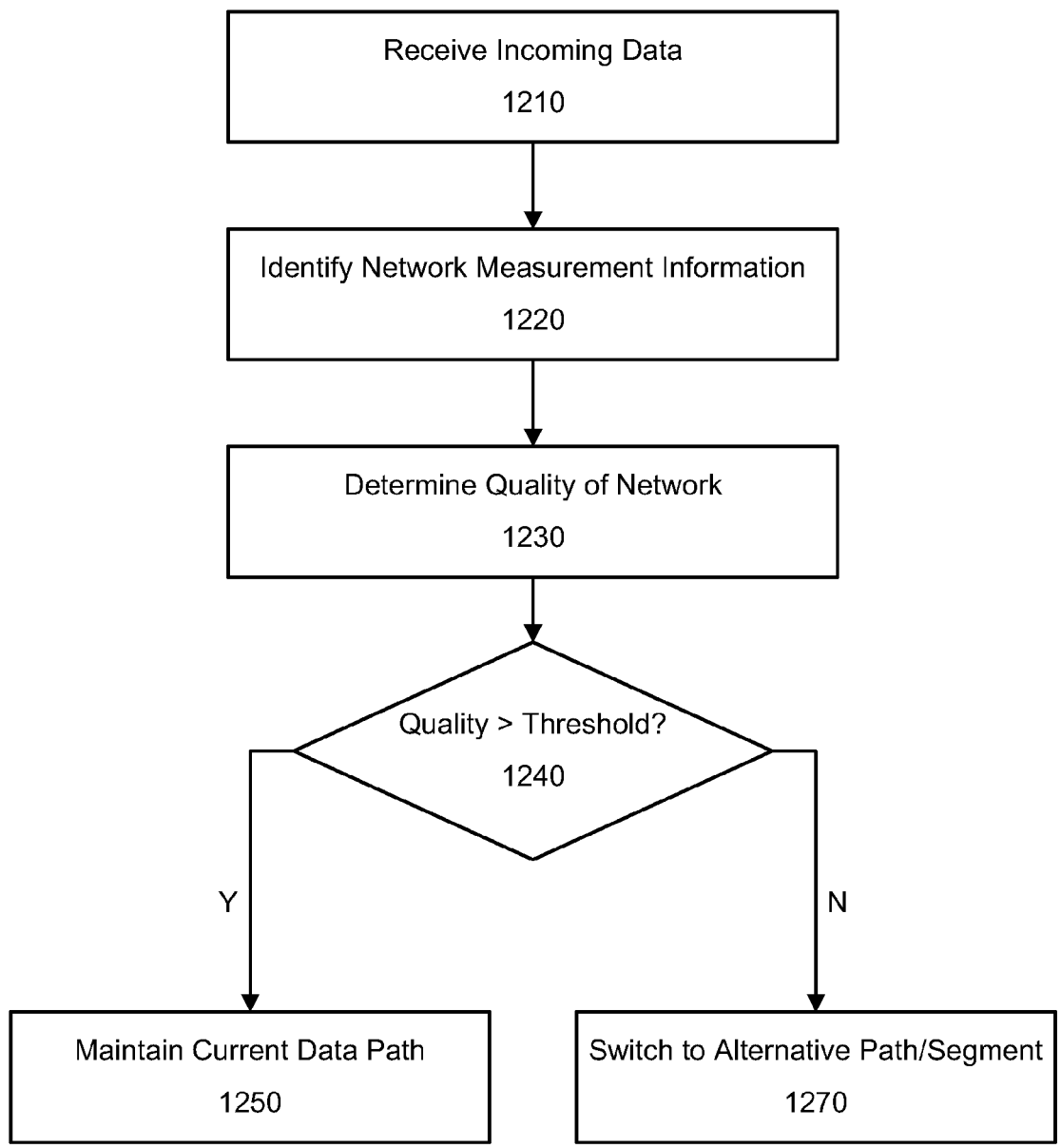
FIG. 12 illustrates an operation for provisioning network resources, according to an embodiment.

FIG. 12 illustrates an operation for provisioning network resources, according to an embodiment. Incoming data is first received, at 1210. Then, at 1220, network measurement information is identified from the incoming data. According to an embodiment, the incoming data is continuously parsed, for purposes of identifying network measurement information. According to another embodiment, the incoming data may be checked, periodically (e.g., at regular intervals), for network measurement information.

At 1230, the quality of the network is determined using the network measurement information. For example, as described with respect to FIGS. 4-9, the quality of the network may be determined according (but not limited) to any of the following network quality parameters: jitter, round-trip delay, data throughput, bandwidth, and/or data loss. It should be noted that the quality parameters may be used to indicate a downstream (e.g., incoming data) and/or upstream (e.g., outgoing data) quality of the network. The network quality is then compared to a threshold value, at 1240 (e.g., a guaranteed network quality).

If the network quality is determined to be above, or equal to, the threshold level (i.e., Quality≧Threshold), then the current data session is maintained, at 1250. In other words, two end devices on the network may continue to communicate (e.g., transmit and/or receive data) via the current data path of the network. According to an embodiment, the current data session is maintained only if all (or a combination) of the quality parameters (e.g., jitter, delay, throughput, bandwidth, and/or data loss) are above, or equal to, a respective threshold level. Alternatively, the current data session may be maintained if at least one of the quality parameters is above, or equal to, a given threshold level.

In an embodiment, the data communication on the current data path is switched over to an alternative data path, at 1270, if the network quality for the current data path is determined to be below the threshold level (i.e., Quality<Threshold). In other words, the data communication between two end devices on the network may be terminated along the current data path, and re-established (i.e. switched over) along the alternative data path. It should be noted that the data session may be re-established on the alternative data path prior to (or concurrently with) terminating the data session on the current data path, thus allowing for a "seamless" transition from one data path to the other (i.e., minimizing data loss during the transition). In an embodiment, the data communication is switched over if at least one of the quality parameters for the current data path is below a given threshold level. Alternatively, the data communication may be switched over if all (or a combination) of the quality parameters for the current data path are below a respective threshold level.

For example, in reference to FIG. 10, the network device 1010 may interpret network measurement information received (e.g., looped-back) from the network device 1020 to determine a quality of the first (i.e., "current") data path, based on one or more network quality parameters (e.g., jitter, delay, throughput, bandwidth, and/or data loss). It should be noted the network quality parameters may be determined with respect to either of the incoming and/or outgoing data. Upon determining that the quality of the first data path (Z-X-M-N-O-K) is below a threshold level, the network device 1010 may immediately switch over a data session on the first data path (Z-X-M-N-O-K) to the second data path (Y-P-L), thus actively maintaining the data communication at, or above, the specified threshold level.

According to an embodiment, the alternative data path corresponds to a protective circuit having a network quality that is above, or equal to, the threshold level. For example, the network device 1010 may determine the quality of the second (i.e., alternative) data path (Y-P-L) prior to switching-over the data communications from the first data path (Z-X-M-N-O-K), at 1270. According to another embodiment, multiple data paths within the network are tested, from which the alternative data path is then selected (e.g., based on a corresponding network quality). For example, the network device 1010 may test the network quality of a number of possible data path permutations (e.g., across any number of intermediate nodes X, Y, Z, M, N, O, P, K, L) within the network infrastructure 1050.

In another embodiment, the data communication along a segment of the current data path is switched over to an alternative network segment, at 1270, if the network quality for the particular segment is determined to be below a corresponding threshold level. In other words, a data communication between two end devices on the network may be terminated only along a selected segment of the current data path, and re-established on the alternative network segment. It should be noted that the data session may be re-established on the alternative network segment prior to (or concurrently with) terminating the data session on the current data path, thus allowing for a seamless transition from one network segment to the other. In an embodiment, the data communication is switched over if at least one of the quality parameters for the segment of the current data path is below a given threshold level. Alternatively, the data communication may be switched over if all (or a combination) of the quality parameters for the segment of the current data path are below a respective threshold level. It should be noted that the corresponding threshold level for a given data path segment may vary based on the length and location of the segment (i.e., not necessarily equivalent to a quality threshold level provided for the overall data path).

For example, in reference to FIG. 11, node M may "snoop" (e.g., interpret) network measurement information transmitted by the network device 1110 to the network device 1120, to determine a quality of the "left-hand" segment of the data path (i.e., Z-X-M) based on one or more network quality parameters (e.g., jitter, delay, throughput, bandwidth, and/or data loss). It should be noted that the network quality parameters may be determined with respect to either of the downstream (e.g., based on original network measurement information transmitted to the network device 1120) and/or upstream data (e.g., based on network measurement information looped-back from the network device 1120). In this example, node M may determine that the quality of the left-hand segment of the data path (i.e., Z-X-M) is above, or equal to, a corresponding threshold level.

Similarly, node M may snoop network measurement information transmitted by the network device 1120 to the network device 1110, to determine a quality of the "right-hand" segment of the data path (i.e., N-O-K). It should be noted that the network quality parameters may be determined with respect to either of the downstream and/or upstream data (e.g., as described with respect to FIG. 4-9). Upon determining that the quality of the right-hand segment of the data path (i.e., N-O-K) is below a corresponding threshold level, node M may immediately switch over a data communication on the right-hand segment of the current data path (i.e., N-O-K) to a new network segment (i.e., P-L), thus actively maintaining the overall data communication at, or above, the specified threshold level.

According to an embodiment, an intermediate node may record (e.g., internally) one or more network measurement parameters snooped from an incoming MST packet (e.g., an arrival and/or transmit time of the MST packet), for purposes of determining the quality of a data path segment (e.g., according to the operations described with respect to FIGS. 4-9). This may be further advantages, for example, for comparing the quality of one data path segment (e.g., the left-hand segment) with that of another data path segment (e.g., the right-hand segment).

According to another embodiment, the alternative network segment corresponds to a protective circuit having a network quality that is above, or equal to, the corresponding threshold level. For example, the network device 1110 may determine the quality of the new (i.e., alternative) network segment (P-L) prior to switching-over the data communications from the right-hand segment of the current data path (N-O-K), at 1270. According to another embodiment, multiple network segments within the network are tested, from which the alternative network segment is then selected (e.g., based on a corresponding network quality). For example, the network device 1110 may test the network quality of a number of possible network segment permutations (e.g., across any number of intermediate nodes X, Y, Z, M, N, O, P, K, L) within the network infrastructure 1150.

It is important to note that, the network provisioning operation described above, with respect to FIG. 12, may be performed by any (or all) of the intermediate nodes along the current data path (e.g., Z, X, M, N, O, and/or K) in the network infrastructure 1150. For example, testing the network quality of multiple data segments may yield a more precise determination of specific problem areas along the data path.

Figure 13:
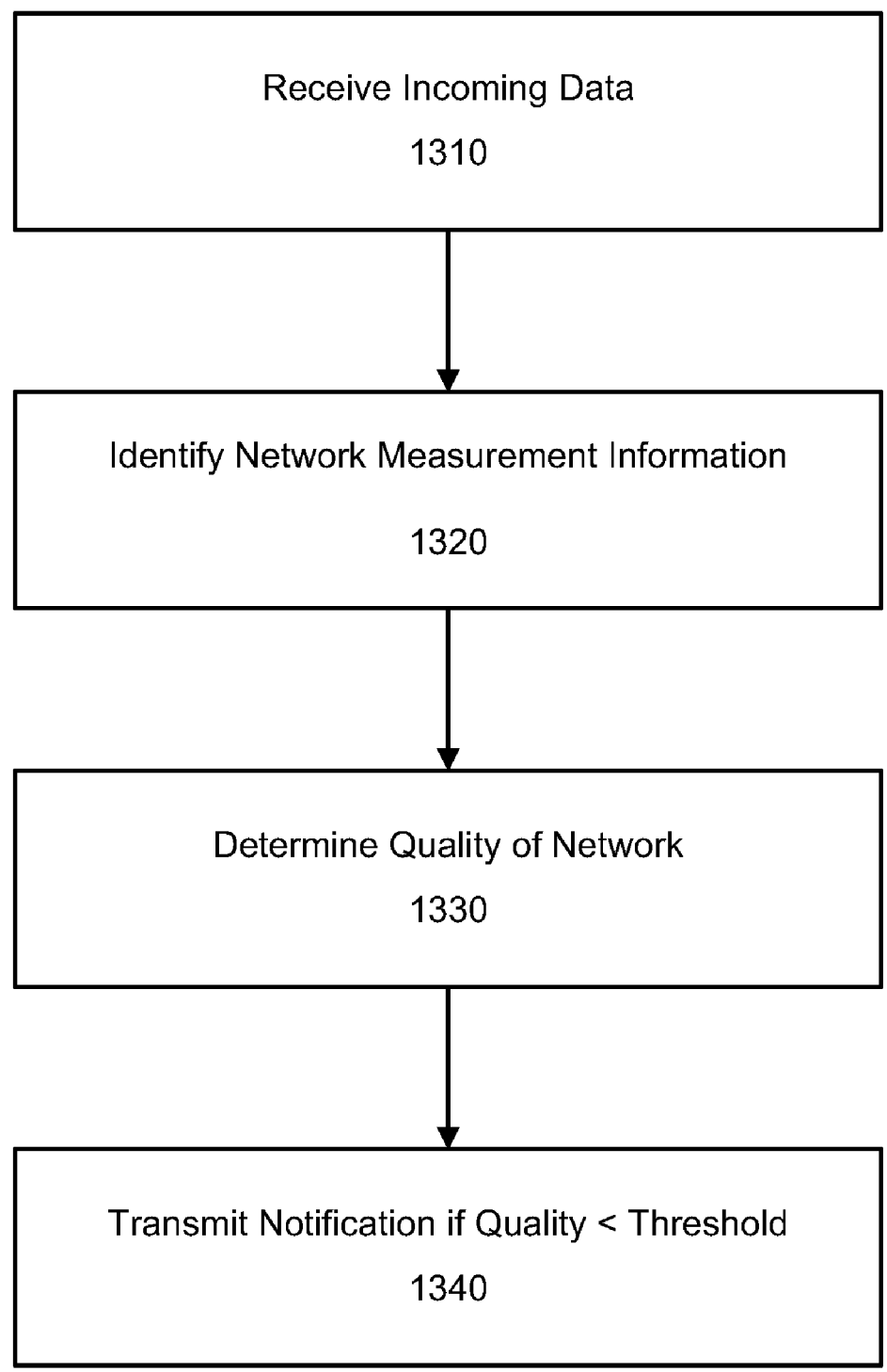
FIG. 13 illustrates an operation for troubleshooting a network, according to an embodiment.

FIG. 13 illustrates an operation for troubleshooting a network, according to an embodiment. Incoming data is first received, at 1310. Then, at 1320, network measurement information is identified from the incoming data. According to an embodiment, the incoming data is continuously parsed, for purposes of identifying network measurement information. According to another embodiment, the incoming data may be periodically checked for network measurement information.

At 1330, the quality of the network is determined using the network measurement information. For example, as described with respect to FIGS. 4-9, the quality of the network may be determined according (but not limited) to any of the following network quality parameters: jitter, round-trip delay, data throughput, bandwidth, and/or data loss. It should be noted that the network quality parameters may be used to indicate a downstream (e.g., incoming data) and/or upstream (e.g., outgoing data) quality of the network.

In an embodiment, a notification message (e.g., an "alarm") is transmitted, at 1340, if the quality of the current data path (i.e., the data path along which data is being transmitted and/or received) is determined to be below the threshold level. According to an embodiment, the notification message is transmitted only if all (or a combination) of the quality parameters (e.g., jitter, delay, throughput, bandwidth, and/or data loss) for the current data path are below a respective threshold level. According to an alternative embodiment, the notification message may be transmitted if at least one of the quality parameters for the current data path is below a given threshold level. According to another embodiment, the notification message indicates, generally, that the quality of the current data path is below a threshold level. Alternatively, the notification message may indicate which of the specific network quality (e.g., jitter, delay, throughput, bandwidth, and/or data loss) for the current data path are below a respective threshold value.

For example, in reference to FIG. 10, the provisioning of resources (e.g., data paths) within a network may be initiated by only the network device 1010 (e.g., which resides at a host or carrier end of the network). Thus, the quality of the current data path (e.g., Z-X-M-N-O-K) may be determined by the network device 1020, while the quality of an alternative data path (e.g., Y-P-L) may be determined and/or maintained by the network device 1010. The network device 1020 may transmit a notification message to the network device 1010 upon determining that the quality of the current data path (Z-X-M-N-O-K) is below a threshold level. Upon receiving the notification, the network device 1010 may then switch-over data communications (i.e., begin transmitting data) to an alternative data path (Y-P-L). For example, the alternative data path may correspond to a protective circuit having a network quality that is (e.g., predetermined/tested to be) above, or equal to, the threshold level.

According to an embodiment, the notification message is written to an outgoing data packet which has already been provisioned for the current data session (e.g., along with network measurement information). In an alternative embodiment, a new network measurement packet may be created for the dedicated purpose of carrying notification messages back to the network (e.g., during one or more empty intervals).

In another embodiment, a notification message (e.g., an "alarm") is transmitted, at 1340, if the network quality for a particular segment of the current data path is determined to be below a corresponding threshold level. According to an embodiment, the notification message is transmitted only if all (or a combination) of the quality parameters (e.g., jitter, delay, throughput, bandwidth, and/or data loss) for the given data path segment are below a respective threshold level. According to an alternative embodiment, the notification message may be transmitted if at least one of the quality parameters for the data path segment is below a given threshold level. According to another embodiment, the notification message indicates, generally, that the quality of the particular data path segment is below a threshold level. Alternatively, the notification message may indicate which of the specific quality parameters (e.g., jitter, delay, throughput, bandwidth, and/or data loss) for the given data path segment are below a respective threshold value. It should be noted, however, that the corresponding threshold level for a given data path segment may vary based on the length and location of the segment (i.e., not necessarily equivalent to a quality threshold level provided for the overall data path).

For example, in reference to FIG. 11, node M may snoop network measurement information transmitted by the network device 1120 to the network device 1110, to determine a quality of the "right-hand" segment of the data path (i.e., N-O-K). It should be noted that such network quality parameters may be determined with respect to either of the downstream (e.g., based on original network measurement information transmitted to the network device 1120) and/or upstream data (e.g., based on network measurement information looped-back from the network device 1120). Upon determining that the quality of the right-hand segment of the data path (i.e., N-O-K) is below a corresponding threshold level, the network device 1110 may transmit a notification to either of the network devices 1110 and/or 1120, which may then switch-over data communications to an alternative network segment (P-L). For example, the alternative network segment may correspond to a protective circuit having a network quality that is (e.g., predetermined/tested to be) above, or equal to, a corresponding threshold level.

According to an embodiment, the notification message is written to an outgoing data packet being forwarded to an end device on the network (e.g., along with network measurement information). In an alternative embodiment, a new network measurement packet may be created for the dedicated purpose of carrying notification messages back to an end device on the network (e.g., during one or more empty intervals).

It is important to note that, the network troubleshooting operation described above, with respect to FIG. 13, may be performed by any (or all) of the intermediate nodes along the current data path (e.g., Z, X, M, N, O, and/or K) in the network infrastructure 1150. For example, testing the network quality of multiple data segments may yield a more precise determination of specific problem areas along the data path. An end device on the network (e.g., the network devices 1110 and/or 1120) may then interpret multiple notifications to determine how best to provision the alternative network segment(s).

Figure 14:
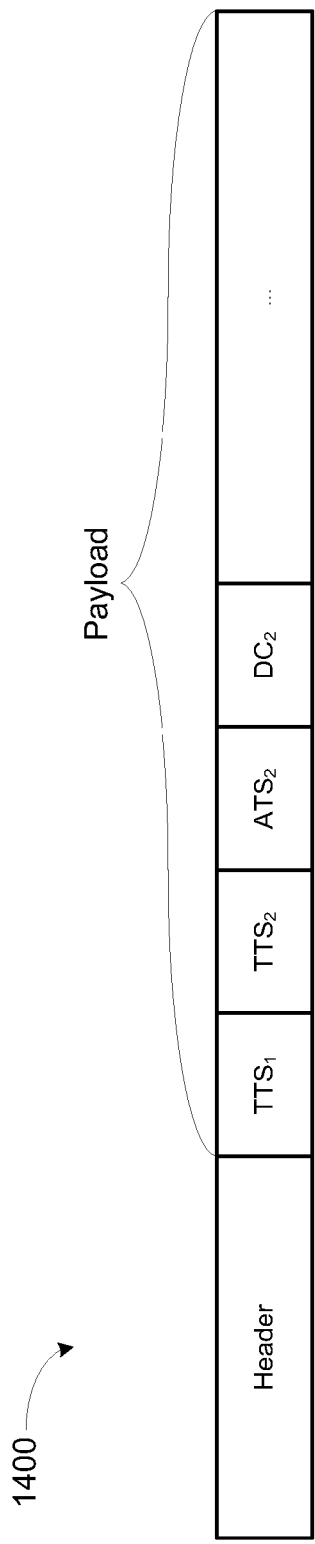
FIG. 14 illustrates a network measurement packet according to an embodiment.

FIG. 14 illustrates a network measurement packet 1400 according to an embodiment. For example, the network measurement packet 1400 may be a standard data packet wherein network measurement information is written (e.g., a CCM packet or other type of OAM packet defined by the IEEE 802.1ag draft standard). Alternatively, the network measurement packet 1400 may be specifically provisioned for purposes of transmitting network measurement information between multiple devices on a network.

The network measurement packet 1400 includes header information and a payload. For example, the header information may identify the network measurement packet 1400 as carrying network measurement information. More specifically, however, the header information may identify precisely where, in the payload (e.g., the data or TLV field), certain network measurement parameters may be identified (e.g., according to a bit location). In this example, the payload includes two transmit time-stamps (e.g., $TTS_1$ and $TTS_2$, indicating when the network measurement packet 1400 was originally transmitted by a first network device and looped-back by a second network device, respectively), an arrival time-stamp (e.g., $ATS_2$, indicating when the network measurement packet 1400 was received by the second network device), and a data count value (e.g., $DC_2$, indicating a number of data packets or bytes received, in succession, by the second network device). Although specific examples of network measurement parameters have been described, it is important to note that the network measurement information is not so limited to the examples described.

It should be noted that the payload may include additional information, further to the network measurement parameters described above. For example, assuming the network measurement packet 1400 is a standard data packet, the payload may include additional data or information to be interpreted by the first network device (i.e., data requests and/or data sent in response to requests by the first network device). It should further be noted that one or more of the network measurement parameters may be included in the header information of the network measurement packet 1400.

Figure 15:
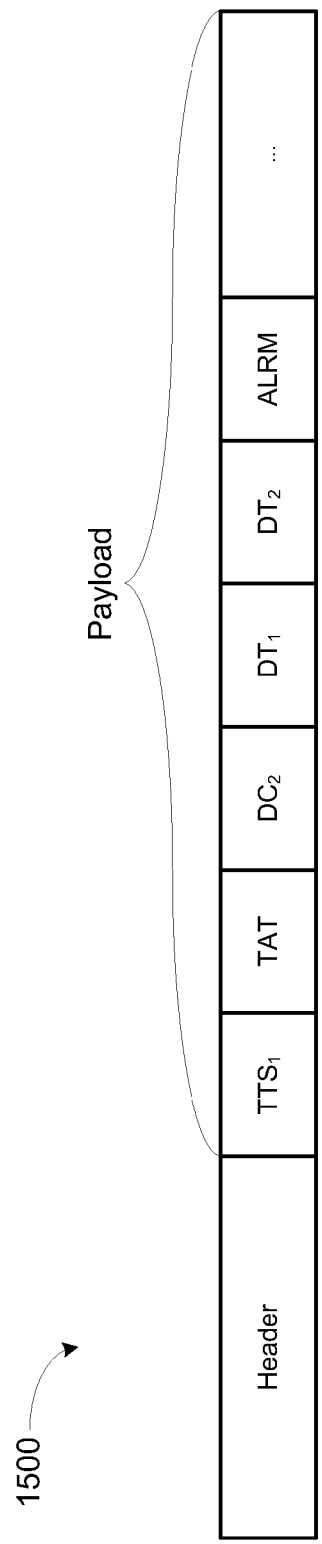
FIG. 15 illustrates a network measurement packet according to an alternative embodiment.

FIG. 15 illustrates a network measurement packet 1500 according to an alternative embodiment. For example, the network measurement packet 1500 may be a standard data packet wherein network measurement information is written. Alternatively, the network measurement packet 1500 may be specifically provisioned for purposes of transmitting network measurement information between multiple devices on a network.

The network measurement packet 1500 includes header information and a payload. For example, the header information may identify the network measurement packet 1500 as carrying network measurement information. More specifically, however, the header information may identify where, in the payload (e.g., the data or TLV field), certain network measurement parameters may be identified. In this example, the payload includes a transmit time-stamp (e.g., $TTS_1$, indicating when the network measurement packet 1500 was originally transmitted by a first network device), a turn-around time (e.g., TAT, indicating the turn-around time for the network measurement packet 1500 at a second network device), a data count value (e.g., $DC_2$, indicating a number of data packets or bytes received, in succession, by the second network device), a first data transmit value (e.g., $DT_1$, indicating a number of data packets or bytes that were transmitted by the first network device), a second data transmit value (e.g., $DT_2$, indicating a number of data packets or bytes that were transmitted by the second device), and an alarm or notification message (e.g., ALRM, indicating that a network quality of the current data path, or a segment of the current data path, is below a specified threshold value). Although specific examples of network measurement parameters have been described, it is important to note that the network measurement information is not so limited to the examples described.

It should be noted that the payload may include additional information, further to the network measurement parameters described above. For example, the payload may include additional data or information to be interpreted by the first network device (i.e., data requests and/or data sent in response to requests by the first network device). It should further be noted that one or more of the network measurement parameters may be included in the header information of the network measurement packet 1500.

Figure 16:
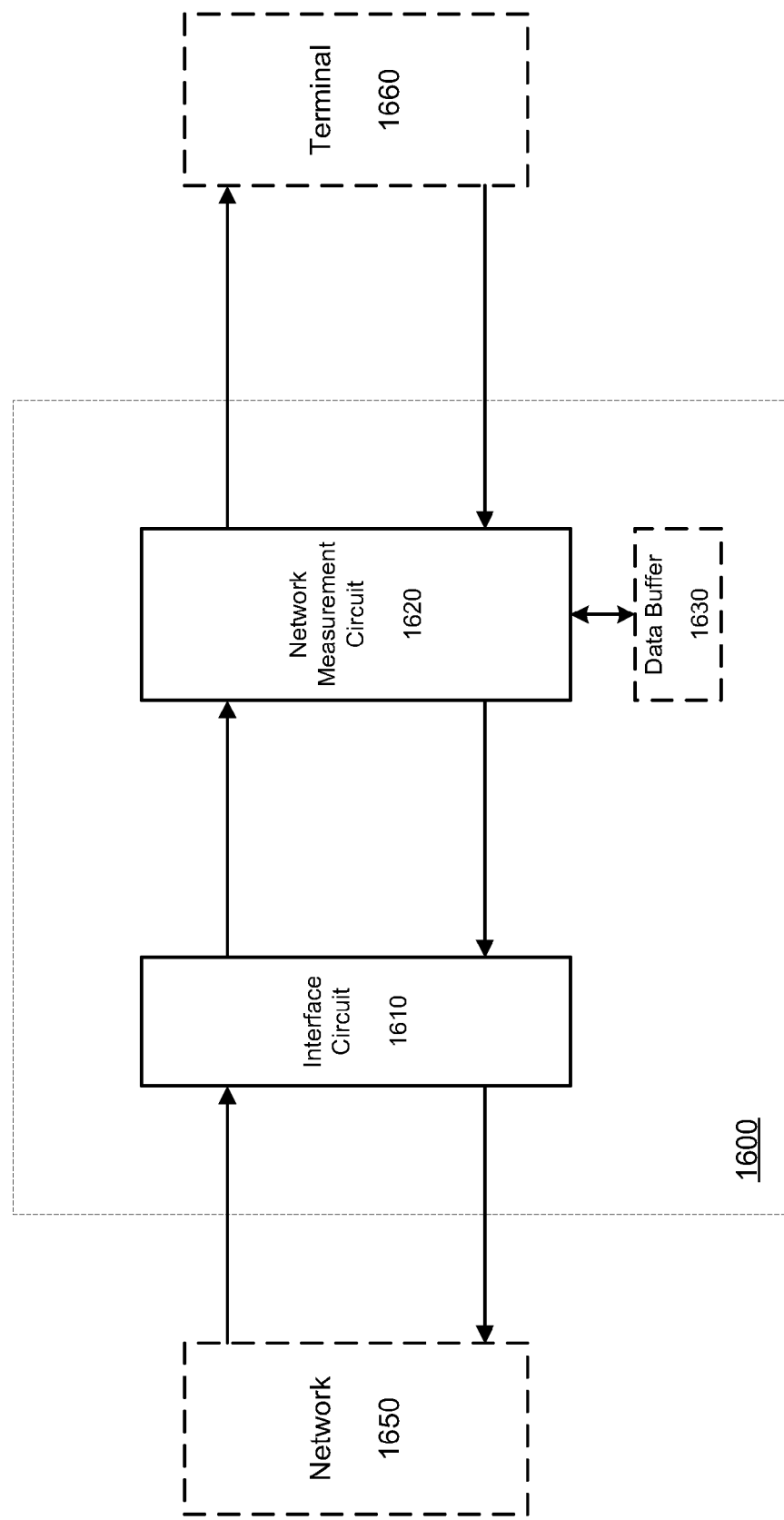
FIG. 16 illustrates a network device according to an embodiment.

FIG. 16 illustrates a network device 1600 according to an embodiment. The network device 1600 includes an interface circuit 1610 and a network measurement circuit 1620. According to an embodiment, the network device 1600 serves as an interface between a network 1650 and a terminal 1660. More specifically, the interface circuit 1610 communicates (i.e., transmits and receives) data between the network 1650 and the network measurement circuit 1620. The network measurement circuit 1620 identifies network measurement information from the incoming data received via the interface circuit 1610. According to an embodiment, the network measurement circuit 1620 continuously parses incoming data, for purposes of identifying network measurement information. According to another embodiment, the network measurement circuit 1620 may periodically check the incoming data for network measurement information.

In an embodiment, the network measurement circuit 1620 loops-back the received network measurement information to the network 1650 (e.g., via the interface circuit 1610). It should be noted that, depending on the availability of a specific outgoing data packet or a given interval in the outgoing data, the loop-back network measurement information may not be transmitted as soon as it is determined. Thus, in an optional embodiment, a data buffer 1630 is provided for storing outgoing network measurement information, to be transmitted at a later time.

In another embodiment, the network measurement circuit 1620 determines one or more network quality parameters of the network 1650 (e.g., jitter, delay, throughput, bandwidth, and/or data loss) based on the received network measurement information (e.g., as described with respect to FIGS. 4-9). In yet another embodiment, the network measurement circuit 1620 may provision network resources and/or troubleshoot the network 1650, based on the determined network quality (e.g., with respect to FIGS. 10-13).

Figure 17:
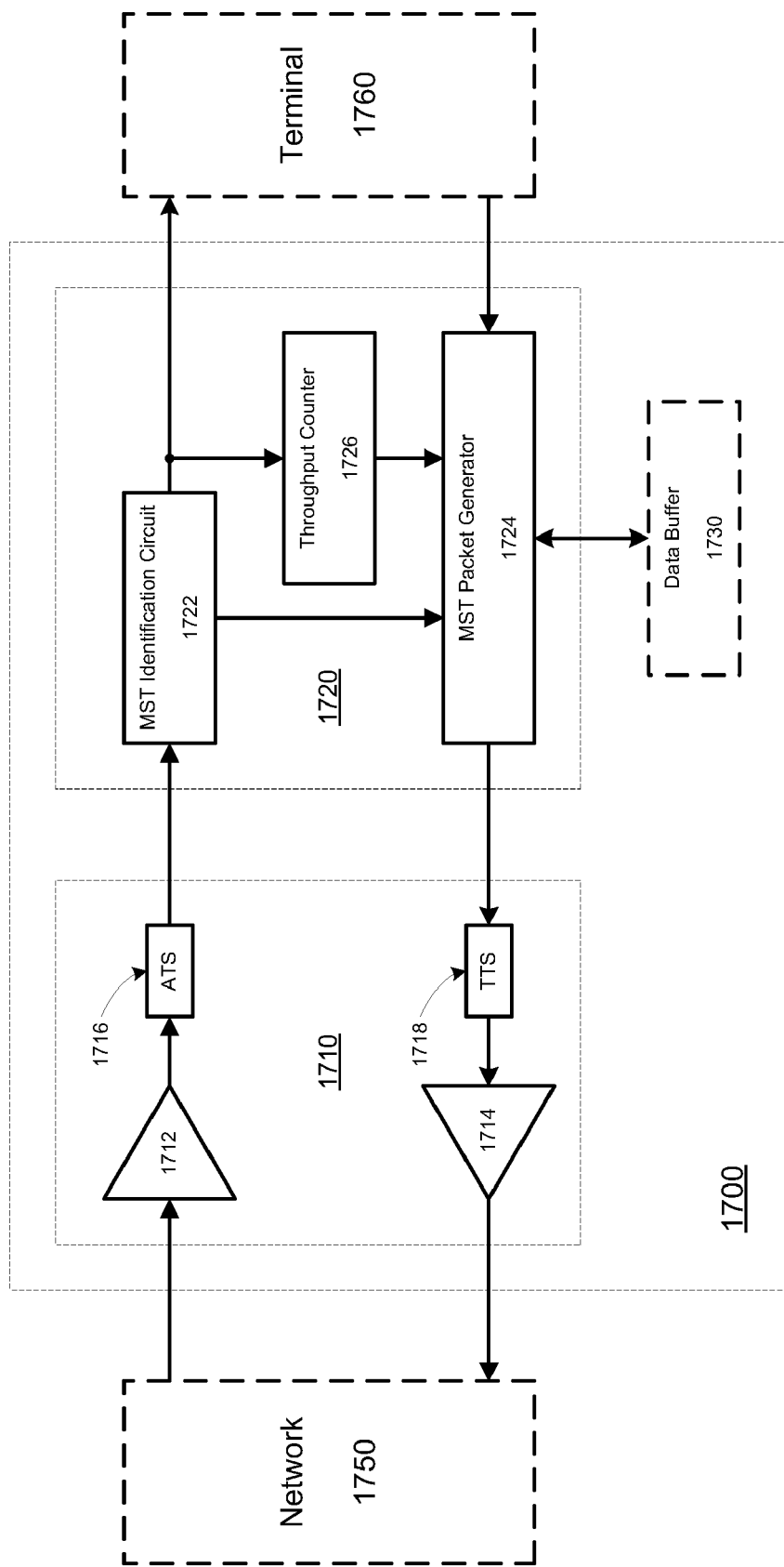
FIG. 17 illustrates a network device according to a more detailed embodiment.

FIG. 17 illustrates a network device 1700 according to a more detailed embodiment. The network device 1700 includes an interface circuit 1710 and a network measurement circuit 1720. The interface circuit 1710 is made up of a data receiver 1712, a data transmitter 1714, an arrival time-stamp (ATS) generator 1716, and a transmit time stamp (TTS) generator 1718. For example, the data receiver 1712 may be an analog-to-digital converter (ADC), and the data transmitter 1714 may be a digital-to-analog converter (DAC). The ATS generator 1716 records a time at which an incoming data packet is received from the network 1750. In an alternative embodiment, the ATS generator 1716 may be included within the network measurement circuit 1720 (e.g., more specifically, within the MST identification circuit 1722). Similarly, the TTS generator 1718 records a time at which an outgoing data packet is transmitted to the network 1750. In an alternative embodiment, the TTS generator 1718 may be included within the network measurement circuit 1720 (e.g., more specifically, within the MST packet generator 1724).

The network measurement circuit 1720 is made up of a network measurement (MST) identification circuit 1722, a network measurement (MST) packet generator 1724, and a throughput counter 1726. For example, the MST identification circuit 1722 identifies network measurement information from the incoming data received via the interface circuit 1710. According to an embodiment, the MST identification circuit 1722 continuously parses incoming data, for purposes of identifying network measurement information. According to another embodiment, the MST identification circuit 1722 may periodically check the incoming data for network measurement information.

The throughput counter 1726 is provided for counting an amount of successively received data (e.g., packets and/or bytes) during a given transmission interval (e.g., as described with respect to FIGS. 7-8). The MST packet generator 1724 loops-back the received network measurement information (e.g., from the MST identification circuit 1722), including new network measurement information generated by the network device 1700 (e.g., from the throughput counter 1726). For example, the MST packet generator 1724 may write the network measurement information to an outgoing data packet which has already been provisioned for the current data session (e.g., a CCM or other type of OAM packet defined by the IEEE 802.1ag draft standard). In an alternative embodiment, the MST packet generator 1724 may generate a new network measurement packet for the dedicated purpose of carrying the outgoing network measurement information back to the network 1750.

It should be noted that, depending on the availability of a specific outgoing data packet or a given interval in the outgoing data, the loop-back network measurement information may not be transmitted as soon as it is determined. Thus, in an optional embodiment, a data buffer 1730 is provided for storing outgoing network measurement information, to be transmitted at a later time.

Figure 18:
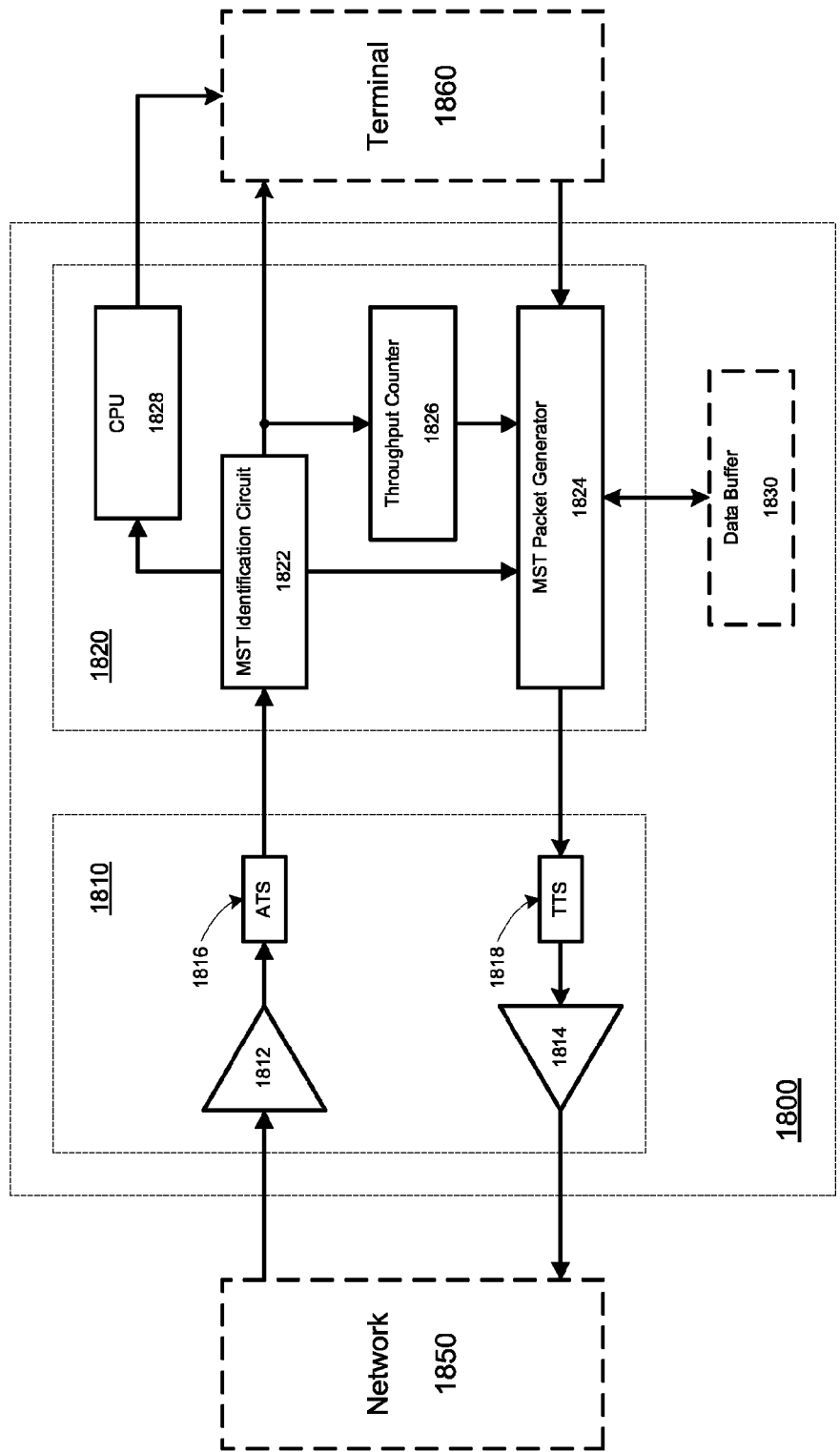
FIG. 18 illustrates a network device according to another embodiment.

FIG. 18 illustrates a network device 1800 according to another embodiment. The network device 1800 includes an interface circuit 1810 and a network measurement circuit 1820. The interface circuit 1810 is made up of a data receiver 1812, a data transmitter 1814, an arrival time-stamp (ATS) generator 1816, and a transmit time stamp (TTS) generator 1818. For example, the data receiver 1812 may be an analog-to-digital converter (ADC), and the data transmitter 1814 may be a digital-to-analog converter (DAC). The ATS generator 1816 records a time at which an incoming data packet is received from the network 1850. In an alternative embodiment, the ATS generator 1816 may be included within the network measurement circuit 1820 (e.g., more specifically, within the MST identification circuit 1822). Similarly, the TTS generator 1818 records a time at which an outgoing data packet is transmitted to the network 1850. In an alternative embodiment, the TTS generator 1817 may be included within the network measurement circuit 1820 (e.g., more specifically, within the MST packet generator 1824).

The network measurement circuit 1820 is made up of a network measurement (MST) identification circuit 1822, a network measurement (MST) packet generator 1824, a throughput counter 1826, and a CPU 1828. For example, the MST identification circuit 1822 identifies network measurement information from the incoming data received via the interface circuit 1810. According to an embodiment, the MST identification circuit 1822 continuously parses incoming data, for purposes of identifying network measurement information. According to another embodiment, the MST identification circuit 1822 may periodically check the incoming data for network measurement information.

The throughput counter 1726 is provided for counting an amount of successively received data (e.g., packets and/or bytes) during a given transmission interval (e.g., as described with respect to FIGS. 7-8). According to an embodiment, the throughput counter 1826 may additionally be used to count an amount of successively transmitted data during a given transmission interval.

The MST packet generator 1824 loops-back the received network measurement information (e.g., from the MST identification circuit 1822), including new network measurement information generated by the network device 1800 (e.g., from the throughput counter 1826). For example, the MST packet generator 1824 may write the network measurement information to an outgoing data packet which has already been provisioned for the current data session (e.g., a CCM or other type of OAM packet defined by the IEEE 802.1ag draft standard). In an alternative embodiment, the MST packet generator 1824 may generate a new network measurement packet for the dedicated purpose of carrying the outgoing network measurement information back to the network 1850.

It should be noted that, depending on the availability of a specific outgoing data packet or a given interval in the outgoing data, the loop-back network measurement information may not be transmitted as soon as it is determined. Thus, in an optional embodiment, a data buffer 1830 is provided for storing outgoing network measurement information, to be transmitted at a later time.

The CPU 1828 is provided for determining one or more network quality parameters of the network 1850 (e.g., jitter, delay, throughput, bandwidth, and/or data loss) based on the received network measurement information (e.g., as described with respect to FIGS. 4-9). The CPU 1828 may then provide the network quality determination to the terminal 1860, to be viewed (e.g., monitored) by a user. In yet another embodiment, the CPU 1828 may include circuitry for provisioning network resources and/or troubleshoot the network 1859, based on the determined network quality (e.g., with respect to FIGS. 10-13).

The embodiments described above may be implemented in a programmed general-purpose or special-purpose computer system or in a network of computer systems. Alternatively, the embodiments may be implemented in a device that includes hardwired logic for carrying out the above-described operations, or any combination of programmed processors and hardwired logic.

Figure 19:
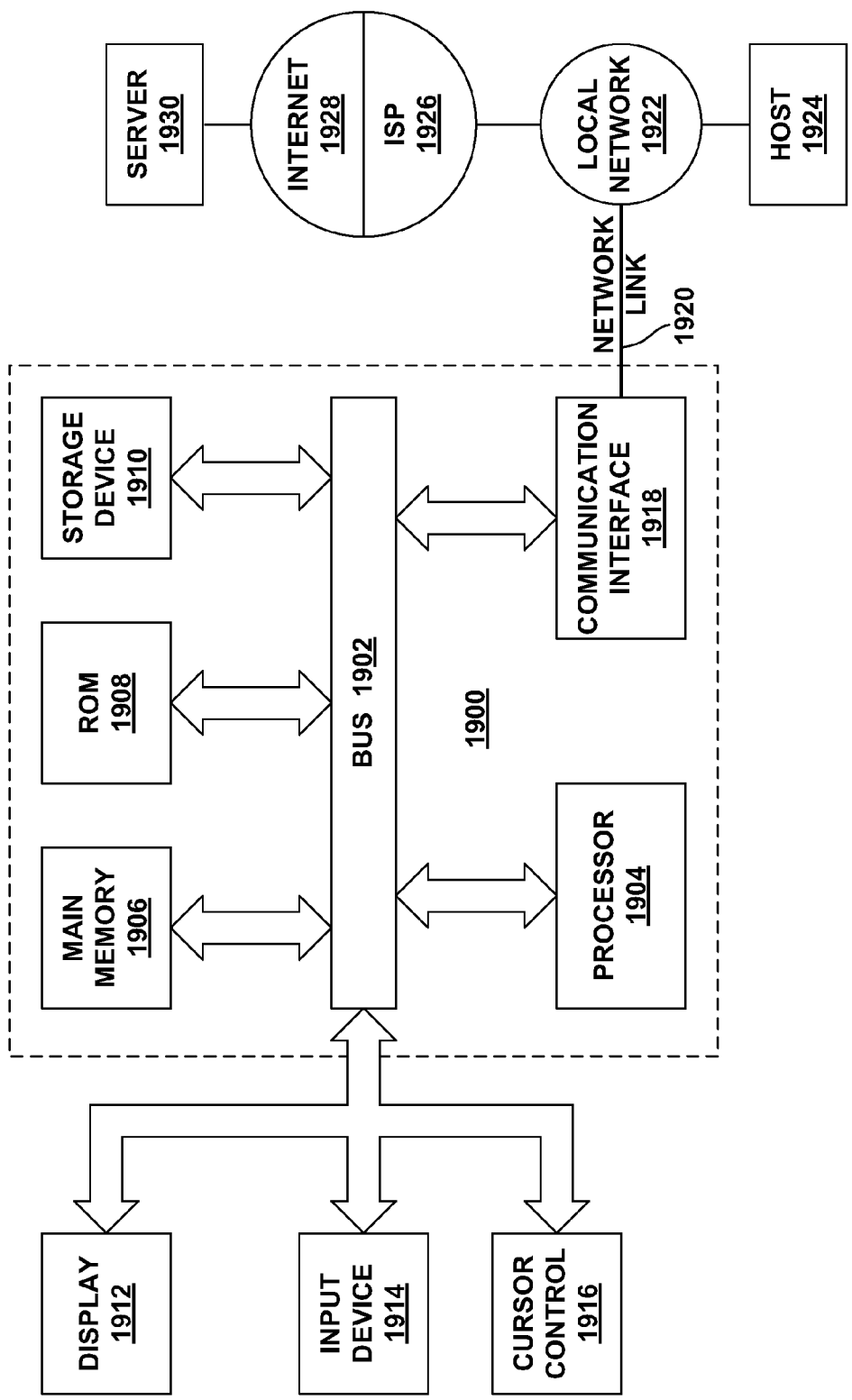
FIG. 19 illustrates a block diagram depicting a computer system upon which an embodiment may be implemented.

FIG. 19 is a block diagram that depicts a computer system 1900 upon which an embodiment may be implemented. Computer system 1900 includes a bus 1902 or other communication mechanism for communicating information, and a processing entity 1904 coupled with bus 1902 for processing information. The processing entity 1904 may include any number of general purpose and/or special purposes processors co-located within a single computing system or distributed over a network of computing systems. Computer system 1900 also includes a main memory 1906, such as a random access memory (RAM) or other dynamic storage device, coupled to bus 1902 for storing information and instructions to be executed by processing entity 1904, including the above described data structures (e.g., tables, variables, etc.) and instructions to be executed by processing entity 1904 to carry out the above-described operations. Main memory 1906 also may be used for storing temporary variables or other intermediate information during execution of instructions to be executed by processing entity 1904. Computer system 1900 further includes a read only memory (ROM) 1908 or other static storage device coupled to bus 1902 for storing static information and instructions for processing entity 1904. A storage device 1910, such as a magnetic disk or optical disk, is provided and coupled to bus 1902 for storing information and instructions, such as the interval total tables described above.

Computer system 1900 may be coupled via bus 1902 to a display 1912, such as a cathode ray tube (CRT), for displaying information to a computer user. An input device 1914, including alphanumeric and other keys, is coupled to bus 1902 for communicating information and command selections to processing entity 1904. Another type of user input device is cursor control 1916, such as a mouse, a trackball, or cursor direction keys for communicating direction information and command selections to processing entity 1904 and for controlling cursor movement on display 1912. This input device typically has two degrees of freedom in two axes, a first axis (e.g., x) and a second axis (e.g., y), that allows the device to specify positions in a plane.

The invention is related to the use of computer system 1900 for implementing the techniques described herein. According to one embodiment of the invention, those techniques are performed by computer system 1900 in response to processing entity 1904 executing one or more sequences of one or more instructions contained in main memory 1906. Such instructions may be read into main memory 1906 from another computer-readable medium, such as storage device 1910. Execution of the sequences of instructions contained in main memory 1906 causes processing entity 1904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processing entity 1904 for execution. Such a medium may take many forms, including but not limited to, non-volatile media, and volatile media. Non-volatile media includes, for example, optical or magnetic disks, such as storage device 1910. Volatile media includes dynamic memory, such as main memory 1906.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processing entity 1904 for execution. For example, the instructions may initially be carried on a magnetic disk of a remote computer. The remote computer can load the instructions into its dynamic memory and send the instructions over a telephone line using a modem. A modem local to computer system 1900 can receive the data on the telephone line and use an infra-red transmitter to convert the data to an infra-red signal. An infra-red detector can receive the data carried in the infra-red signal and appropriate circuitry can place the data on bus 1902. Bus 402 carries the data to main memory 1906, from which processing entity 1904 retrieves and executes the instructions. The instructions received by main memory 1906 may optionally be stored on storage device 410 either before or after execution by processing entity 1904.

Computer system 1900 also includes a communication interface 1918 coupled to bus 1902. Communication interface 1918 provides a two-way data communication coupling to a network link 1920 that is connected to a local network 1922. For example, communication interface 1918 may be an integrated services digital network (ISDN) card or a modem to provide a data communication connection to a corresponding type of telephone line. As another example, communication interface 1918 may be a local area network (LAN) card to provide a data communication connection to a compatible LAN. Wireless links may also be implemented. In any such implementation, communication interface 1918 sends and receives electrical, electromagnetic or optical signals that carry digital data streams representing various types of information.

Network link 1920 typically provides data communication through one or more networks to other data devices. For example, network link 1920 may provide a connection through local network 1922 to a host computer 1924 or to data equipment operated by an Internet Service Provider (ISP) 1926. ISP 1926 in turn provides data communication services through the world wide packet data communication network now commonly referred to as the "Internet" 1928. Local network 1922 and Internet 1928 both use electrical, electromagnetic or optical signals that carry digital data streams. The signals through the various networks and the signals on network link 1920 and through communication interface 1918, which carry the digital data to and from computer system 1900, are exemplary forms of carrier waves transporting the information.

Computer system 1900 can send messages and receive data, including program code, through the network(s), network link 1920 and communication interface 1918. In the Internet example, a server 1930 might transmit a requested code for an application program through Internet 1928, ISP 1926, local network 1922 and communication interface 1918.

The received code may be stored in storage device 1910, or other non-volatile storage for later execution.

The section headings in the preceding detailed description are provided for convenience of reference only, and in no way define, limit, construe or describe the scope or extent of such sections. Also, while the invention has been described with reference to specific exemplary embodiments thereof, various modifications and changes may be made thereto without departing from the broader spirit and scope of the invention. For example, features or aspects of any of the embodiments may be applied, at least where practicable, in combination with any other of the embodiments or in place of counterpart features or aspects thereof. The specification and drawings are, accordingly, to be regarded in an illustrative rather than restrictive sense.

What is claimed is:

1. A method of operating a first device coupled to a network, the method comprising:
   receiving a first set of data from a second device in the network via a first data path;
   parsing the first set of data received from the second device at real-time to identify
   a first set of measurement information wherein said first set of measurement information is identified and calculated concurrently with the receipt of said first set of data,
   wherein the first set of measurement information includes one or more measurement parameters previously transmitted from the first device to the second device;
   determining in real time a quality of the first data path based, at least in part, on the first set of measurement information; and
   selectively transmitting data to the second device via one of the first data path or a second data path of the network based on the determined quality of the first data path and without interrupting other data on said data path.

2. The method of claim 1 wherein the first set of data comprises
   at least one of a data request from the first device or a data request from the second device.

3. The method of claim 1 wherein the quality of the first data path comprises at least one of a delay, jitter, throughput, or bandwidth of the first data path.

4. The method of claim 1 wherein selectively transmitting data to the second device comprises transmitting the data to the second device via the second data path and without interrupting other data on said data path if the quality of the first data path is less than a threshold level.

5. The method of claim 4 wherein selectively transmitting data to the second device comprises determining that a quality of the second data path is greater than or equal to a threshold level.

6. The method of claim 1 further comprising generating a second set of measurement information based, at least in part, on the first set of measurement information.

7. The method of claim 6 wherein the second set of measurement information includes at least part of the first set of measurement information.

8. The method of claim 6 wherein generating the second set of measurement information comprises counting successive data packets of the first set of data based, at least in part, on the first set of measurement information.

9. The method of claim 6 wherein selectively transmitting data to the second device comprises writing the second set of measurement information to a data packet to be transmitted to the second device without interrupting other data on said data path.

10. The method of claim 1 wherein determining the quality of the first data path comprises comparing the first set of measurement information to one or more threshold values.

11. A method of operating a device coupled to a network, the method comprising:
    receiving a first set of data from a first device on the network;
    parsing in real-time the first set of data received from the first device to identify a first set of measurement information, wherein the first set of measurement information includes one or more measurement parameters transmitted from a second device in the network to the first device and wherein said first set of measurement information is identified and calculated concurrently with the receipt of said first set of data;
    determining in real time a quality of a first network segment based, at least in part, on the first set of measurement information, wherein the first network segment corresponds to a data path between the second device and the first device; and
    transmitting the first set of data to the second device on the network.

12. The method of claim 11 further comprising transmitting without interrupting other data on said data path a notification to at least one of the first device or the second device if the quality of the first network segment is less than a threshold level.

13. The method of claim 12 wherein transmitting the notification comprises writing the notification to the first set of data.

14. The method of claim 11 wherein the quality of the first network segment comprises at least one of a delay, jitter, throughput, or bandwidth of the first data path.

15. The method of claim 11 further comprising counting successive data items of the first set of data based, at least in part, on the first set of measurement information.

16. The method of claim 11 wherein the first set of data comprises at least one of data requested by the first device or a data request from the second device.

17. The method of claim 11 further comprising:
    receiving a second set of data from the second device on the network;

identifying, from the second set of data, a second set of measurement information;
determining a quality of a second network segment based, at least in part, on the second set of measurement information; and
transmitting the second set of data to the first device on the network.

18. The method of claim 17 further comprising transmitting a notification to at least one of the first device or the second device if the quality of the second network segment is less than a threshold level.

19. The method of claim 17 wherein transmitting the first set of data comprises selectively transmitting the first set of data to the second device via either the second network segment or a third network segment based, at least in part, on the quality of the second network segment.

20. The method of claim 19 wherein selectively transmitting the first set of data comprises transmitting the first set of data via the third network segment if the quality of the second network segment is less than a threshold level.

21. The method of claim 20 wherein selectively transmitting the first set of data further comprises determining that a quality of the third network segment is greater than or equal to the threshold level.

22. The method of claim 17 wherein transmitting the second set of data comprises selectively transmitting the second set of data to the first device via either the first network segment or a fourth network segment based, at least in part, on the quality of the first network segment.

* * * * *